(12) United States Patent
Okubo et al.

(10) Patent No.: US 6,728,298 B1
(45) Date of Patent: Apr. 27, 2004

(54) SPREAD SPECTRUM COMMUNICATION SYSTEM AND METHOD FOR THE SAME

(75) Inventors: Seiji Okubo, Tokyo (JP); Akinori Fujimura, Tokyo (JP); Toshiharu Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/518,266

(22) Filed: Mar. 3, 2000

(30) Foreign Application Priority Data

Jul. 14, 1999  (JP) .......................................... 11-200973

(51) Int. Cl.⁷ .............................................. H04B 1/707
(52) U.S. Cl. ..................................................... 375/146
(58) Field of Search ................................. 375/140, 146, 375/144, 148, 150

(56) References Cited

U.S. PATENT DOCUMENTS 6,002,707 A * 12/1999 Thue .......................... 375/130

6,175,327 B1 * 1/2001 Lin et al. ................ 342/357.06

FOREIGN PATENT DOCUMENTS

JP          6-197096          7/1994

* cited by examiner

*Primary Examiner*—Stephen Chin
*Assistant Examiner*—Kevin Kim
(74) *Attorney, Agent, or Firm*—Birch, Stewart, Kolasch & Birch, LLP

(57) ABSTRACT

There are provided a spread code generating section generates a spread code list from the input parallel information, spread modulating sections generate a plurality of parallel spectrum spread signals corresponding to the parallel information list by multiplying each of the parallel information list and the spread code list respectively, phase shifting sections shift the phase of the parallel spectrum spread signals, delay sections delay the parallel spectrum spread signals. A multiplexing section generates a multiplexed spectrum spread signal by adding the delayed parallel spectrum spread signals. The multiplexed spectrum spread signal are converted into a radio frequency signal, amplified and then transmitted.

14 Claims, 17 Drawing Sheets

SPREAD SPECTRUM COMMUNICATION SYSTEM AND METHOD FOR THE SAME

FIELD OF THE INVENTION

The present invention relates to a spread spectrum communication system and a method for the same in which spread spectrum modulation using a direct spread (DS) method is carried out by using the same spread code list for a parallel data list, spread spectrum modulation signals are multiplexed and transmitted, and the transmitted spread spectrum modulation signals are demodulated to receive the parallel data list.

BACKGROUND OF THE INVENTION

In recent years, Code Division Multiple Access (CDMA) communicating method using a spread spectrum method as one of traffic transmitting methods such as images, voices, data and the like have been put into practical use in a mobile communication system and a satellite communication system.

The spread spectrum communicating method includes a direct spread (DS) method, a frequency hopping (FH) method and the like. In the DS method, a spread code list having a much wider band than the band of an information signal is directly multiplied by the information signal, thereby performing the spread spectrum of the information signal to carry out communication.

FIG. 17 is a block diagram showing the structure of a conventional spread spectrum communication system in which spread spectrum is carried out by using the same spread code list for parallel data, different time delays are given to spectrum spread signals to be multiplexed and transmitted. In FIG. 17, a data generating section 101 generates a binary digital information signal having a value of "1" or "−1". In the following description, the speed at which the digital information signal is generated will be referred to as a bit rate and it is denoted as "$R_b$". A serial/parallel converting section 102 converts the digital information signal input from the data generating section 101 into parallel information signal having n channels. A multiplex number n is equal to or less than spread code length L (bit). In the following description, the speed at which the parallel information signal in each channel is generated will be referred to as a parallel bit rate and it is denoted as "$R_p$" (=$R_b/n$).

A spread code generating section 104 generates a spread code list. The spread code list has a value of a "1" or "−1" and a spread code list having a spread code length L (bit) which is generated by a clock generating section 103 and has a clock frequency band that is spread code length L times as much as the parallel bit rate $R_p$. It is desirable that the circuit used for creating the codes has a simple structure and that the codes have great auto-correlation characteristics and small cross-correlation therebetween. Therefore, as a proper code list, for example, M list, Gold code and the like are used. In the following description, a clock rate generated by the clock generating section 103 will be referred to as a chip rate $R_c$ (=$R_p \times L$) and a clock cycle having the chip rate $R_c$ will be referred to as a chip cycle $T_c$ (=$1/R_c$).

Each one of the n channel parallel information signal converted by the serial/parallel converting section 102 is input into the spread modulating sections 105-1 to 105-n, respectively. The spread modulating sections 105-1 to 105-n multiply the parallel information signal and a spread code input from the spread code generating section 104, thereby generating parallel spectrum spread signals for n channels. As a result, each of the parallel spectrum spread signal has the chip rate $R_c$.

Each parallel spectrum spread signal is input into each of the delay sections 107-1 to 107-n. Each of the delay sections 107-1 to 107-n delays the parallel spectrum spread signal by times $\{b_1, b_2, b_3, \ldots b_n\}$ respectively and output the same signals to a multiplexing section 108. The multiplexing section 108 performs multiplexing by adding each of the parallel spectrum spread signal which have been delayed differently, and a multiplexed spectrum spread signal thus obtained is sent to a frequency converting section 109. Although each of the parallel spectrum spread signal is spectrum-spread by the same spread code list in the spread modulating sections 105-1 to 105-n, they have been delayed differently in the delay sections 107-1 to 107-n. Therefore, a small cross-correlation is obtained between data lists at the time of the code synchronization of the data list corresponding to each of the parallel spectrum spread signal on the receiving side for receiving the multiplexed parallel spectrum spread signal.

A frequency converting section 109 frequency-converts the input multiplexed spectrum spread signal to obtain the radio frequency (RF), then generates a multiplexed RF signal is power-amplified by a power amplifying section 110 and transmitted using an antenna 111.

FIG. 18 is a block diagram showing the structure of a conventional spread spectrum communication system for receiving the multiplexed RF signal. In FIG. 18, an RF amplifying section 122 receives the multiplexed RF signal from an antenna 121 and amplifies the multiplexed RF signal. A quadrature detecting section 123 causes a multiplier 141 to multiply a local carrier signal output from a voltage-controlled oscillator (VCO) 143 and the multiplexed RF signal input from the RF amplifying section 122, causes a low-pass filter 145 to remove the high-frequency component of the multiplied signal, and furthermore, causes an A/D converter 147 to convert the multiplied signal into digital data, thereby generating the in-phase component of the complex spectrum spread signal having the frequency band of the chip rate $R_c$. On the other hand, a multiplier 142 also multiplies the local carrier signal which is phase-shifted by $\pi/2$ by means of a $\pi/2$ phase shifter 144 and the multiplexed RF signal input from the RF amplifying section 122 for a signal output from the voltage-controlled oscillator 143, a low-pass filter 146 removes the high-frequency component of the multiplied signal, and furthermore, an A/D converter 148 converts the multiplied signal into digital data, thereby generating the orthogonal component of the complex spectrum spread signal having a frequency band of a chip rate $R_c$.

A correlation value calculating section 124 obtains a correlation between the complex spectrum spread signal input from the quadrature detecting section 123 and a spread code list which is the same as the spread code list generated by the spread code generating section 104. More specifically, an in-phase correlation value calculating section 149 in the correlation value calculating section 124 outputs, as an in-phase correlation value, a correlation value of the complex spectrum spread signal and the spread code list which is the same as a spread code multiplied to the multiplexed RF signal. Further, an orthogonal correlation value calculating section 150 in the correlation value calculating section 124 outputs, as an orthogonal correlation value, a correlation value of the complex spectrum spread signal and the spread code list which is the same as the spread code multiplied to the multiplexed RF signal. The correlation in the in-phase correlation value calculating section 149 and the orthogonal correlation value calculating section 150 can be implemented by using a matched filter and the like.

A code synchronizing section 125 generates a symbol clock CK synchronized with the cycle of the spread code list multiplied by the multiplexed RF signal from the in-phase correlation value and the orthogonal correlation value which are output from the correlation value calculating section 124, and outputs the symbol clock CK to data demodulating sections 128-1 to 128-n.

Delay correcting sections 126-1 to 126-n perform delay correction in such a manner that the timings of the peak values of the in-phase correlation value and the orthogonal correlation value for corresponding parallel spectrum spread signals match respectively. More specifically, the shift of the timings of the parallel spectrum spread signals which is caused due to the provision of the delay by the delay sections 107-1 to 107-n shown in FIG. 17 is eliminated.

The data demodulating sections 128-1 to 128-n latch the in-phase correlation value and the orthogonal correlation value in a timing synchronous with the symbol clock CK for the in-phase correlation values and the orthogonal correlation values for n channels which are output from the delay correcting sections 126-1 to 126-n, respectively. Based on the latched in-phase correlation value and orthogonal correlation value, data decision is carried out to perform demodulation. Then, the demodulation data output from each of the data demodulating sections 128-1 to 128-n are converted into serial data by a parallel/serial converting section 129 and are output as n channel demodulation data. The parallel demodulation data output from the data demodulating sections 128-1 to 128-n have a parallel bit rate $R_p$ and are binary data signals having a value of "1" or "−1". Accordingly, the demodulation data having 1-channel bit rate $R_b$ (=n×$R_p$) are output from the parallel/serial converting section 129.

The above-mentioned multiplexed RF signal is generated by multiplexing the n channel parallel spectrum spread signals multiplied by the same spread code list. However, the cross-correlation between the channels during the data demodulation is reduced by giving various delay times for the channels. Therefore, it is possible to perform the demodulation for the channels by the data demodulating sections 128-1 to 128-n.

In the conventional spread spectrum communication system, thus, the n channel parallel information signal can be transmitted and received by using one spread code list. In the spread spectrum communication system on the receiving side, therefore, the n channel parallel information signal can be received by using only a pair of correlators. Thus, a simple structure is sufficient. More specifically, in a general spectrum spread communicating method, in the case where a RF signal having the n channel multiplexed is to be transmitted and received, n different spread code lists are assigned to each channel to perform the spectrum spread for multiplexing and the demodulation is carried out by using n correlators having n different spread code lists on the receiving side. In the conventional spread spectrum communication system, however, the multiplexed RF signal can be generated by one spread code list and the signals for n channels can be demodulated by using only a pair of correlators.

In the conventional spread spectrum communication system described above, all the n channel parallel spectrum spread signals are added in the multiplexing section 108 to generate a multiple spectrum spread signal, and a frequency converting section 109 converts the generated multiplexed spectrum spread signal into the multiplexed RF signal. Therefore, the maximum amplitude of the multiplexed spectrum spread signal is n times as much as the amplitude of each of the parallel spectrum spread signal. The multiplexed RF signal has a maximum value which is n times as much as the maximum value of the RF signal without multiplexing.

In general, the multiplexed spectrum spread signal is a multivalued modulation signal. In the case where the amplitude of the multivalued modulation signal is to be power-amplified, it is desirable that the power amplifying section 110 should be used on an operating point which is as close to a saturation point as possible, that is, an operating point having a small output back-off in order to enhance the power efficiency.

However, in the case where the operating point of the amplifier is set in a region having a small output back-off, non-linearity such as input amplitude/output amplitude non-linear (AM/AM) characteristic and the like is notable. For example, in the case where the power amplifying section 110 shown in FIG. 17 is to be used on an operating point having a small output back-off, there has been a problem that the output signal of the power amplifying section 110 is greatly distorted to deteriorate a bit error ratio during transmission and receipt in the spread spectrum communication system if a signal having a great maximum amplitude is input, to the power amplifying section 110, as the RF signal output from the frequency converting section 109.

SUMMARY OF THE INVENTION

It is an object of the present invention to obtain a spread spectrum communication system and a method for the same which can reduce a deterioration in the bit error ratio of each information multiplexed into a multiplexed spectrum spread signal also in the case where an operation is carried out on an operating point having the small output back-off of a power amplifier.

According to the spread spectrum communication system of the present invention, a converting unit converts input serial information into parallel information, a spread code generating unit generates a spread code list synchronous with a clock generated by the clock generating unit for generating a clock having a frequency band of a chip rate corresponding to a spread code length, a spread modulating unit multiplies each of the parallel information list converted by the converting unit and the spread code list generated by the spread code generating unit respectively, thereby generating a plurality of parallel spectrum spread signals corresponding to the parallel information list, a phase shifting unit shifts the parallel spectrum spread signals by a plurality of phase shifting amounts, a delay unit delays the parallel spectrum spread signals having the phases shifted by the phase shifting unit by different amounts, a multiplexing unit generates a multiplexed spectrum spread signal obtained by adding the parallel spectrum spread signals delayed by the delay unit, and a transmitting unit converts the multiplexed spectrum spread signal generated by the multiplexing unit into a radio frequency signal, amplifies and transmits the radio frequency signal. Consequently, the maximum amplitude of the multiplexed spectrum spread signal can be reduced.

According to the spread spectrum communication system of the present invention, a receiving unit receives a multiplexed spectrum spread signal which is obtained by adding and multiplexing a plurality of spectrum spread signals which are spread in a predetermined spread code list, each of the spectrum spread signals having a plurality of phase shifting amounts and a plurality of different delay amounts respectively, a quadrature detecting unit generates, from the multiplexed spectrum spread signal, in-phase components and orthogonal components of the spectrum spread signals having a frequency band of a chip rate corresponding to the predetermined spread code list, a correlating unit calculates an in-phase correlation value and an orthogonal correlation value which are correlation values between the in-phase components and the orthogonal components of the spectrum spread signals and the predetermined spread code list, a code synchronizing unit generates a symbol clock which is common to the spectrum spread signals based on the in-phase correlation value and the orthogonal correlation value, a delay correcting unit branches the in-phase correlation value and the orthogonal correlation value corresponding to a plurality of values of the spectral spread signals and performs delay correction to arrange peak values of the in-phase correlation value and the orthogonal correlation value corresponding to each delay amount of the spectrum spread signals, a phase-shift correcting unit corrects shift of carrier phases of the in-phase correlation value and the orthogonal correlation value which are delay corrected by the delay correcting unit corresponding to the phase shifting amounts, a demodulating unit generates a plurality of demodulating signals corresponding to the spectrum spread signal from each of the in-phase correlation values and orthogonal correlation values which have the phases shifted by the phase-shift correcting unit, and a converting unit converts a plurality of demodulation signals demodulated by the demodulating unit into serial information. Consequently, each of the parallel spectrum spread signal can reliably be demodulated based on the multiplexed spectrum spread signal having a small maximum amplitude.

According to the spread spectrum communication system of the present invention, when carrying out parallel communication of a plurality of channels by using the same spread code list between a transmitting side device and a receiving side device, in the transmitting side device, a first converting unit converts input serial information into parallel information, a spread code generating unit generates a spread code list synchronous with the clock generated by the clock generating unit for generating a clock having a frequency band of a chip rate corresponding to a spread code length, a spread modulating unit multiplies each of the parallel information list converted by the first converting unit and the spread code list generated by the spread code generating unit respectively, thereby generating a plurality of parallel spectrum spread signals corresponding to the parallel information list, a phase shifting unit shifts the parallel spectrum spread signals by a plurality of phase shifting amounts, the delay unit delays the parallel spectrum spread signals having the phases shifted by the phase shifting unit by different amounts, a multiplexing unit generates a multiplexed spectrum spread signal obtained by adding the parallel spectrum spread signals delayed by the delay unit, and a transmitting unit converts the multiplexed spectrum spread signal generated by the multiplexing unit into a radio frequency signal, amplifies and transmits the radio frequency signal, and in the receiving side device, a receiving unit receives a multiplexed spectrum spread signal transmitted from the transmitting unit, a quadrature detecting unit generates, from the multiplexed spectrum spread signal, in-phase components and orthogonal components of the spectrum spread signals having a frequency band of a chip rate corresponding to the same spread code list, a correlating unit calculates an in-phase correlation value and an orthogonal correlation value which are correlation values between the in-phase components and the orthogonal components of the spectrum spread signals and the predetermined spread code list, a code synchronizing unit generates a symbol clock which is common to the spectrum spread signals based on the in-phase correlation value and the orthogonal correlation value, a delay correcting unit branches the in-phase correlation value and the orthogonal correlation value corresponding to a plurality of values of the spectral spread signals and performs delay correction to arrange peak values of the in-phase correlation value and the orthogonal correlation value corresponding to each delay amount of the spectrum spread signals, a phase-shift correcting unit corrects shift of carrier phases of the in-phase correlation value and the orthogonal correlation value which are delay corrected by the delay correcting unit corresponding to the phase shifting amounts, a demodulating unit generates a plurality of demodulating signals corresponding to the spectrum spread signal from each of the in-phase correlation values and orthogonal correlation values which have the phases shifted by the phase-shift correcting unit, and a second converting unit converts a plurality of demodulation signals demodulated by the demodulating unit into serial information. Consequently, the maximum amplitude of the multiplexed spectrum spread signal can be reduced.

Further, a part of the phase shifting amounts to be phase-shifted by the phase shifting unit is set to an arbitrary phase of $\beta$ or a phase of $(\beta+\pi)$ and the other phase shifting amounts are set to a phase of $(\beta+\pi/2)$ or a phase of $(\beta-\pi/2)$. Consequently, the maximum amplitude of the multiplexed spectrum spread signal can be reduced by the minimum change in the phase.

Further, the phase shifting amounts to be phase-shifted by the phase shifting unit is n (n is a natural number which is equal to or greater than 2), each phase shifting amount being an arbitrary phase of $(\gamma+p\pi/n)$ or a phase of $(\gamma+p\pi/n+\pi)$ (p=0 to n−1). Consequently, the phase shifting amount is given in such a manner that the maximum amplitude of the multiplexed spectrum spread signal can be minimized.

According to the spread spectrum communication method of the present invention, a converting step converts input serial information into parallel information, the spread modulating step multiplies each of the parallel information list converted at the converting step and a predetermined spread code list, thereby generating a plurality of parallel spectrum spread signals corresponding to the parallel information list, a phase shifting step shifts the parallel spectrum spread signals by a plurality of phase shifting amounts, a delay step delays the parallel spectrum spread signals having the phases shifted by the phase shifting step by different amounts, a multiplexing step generates a multiplexed spectrum spread signal obtained by adding the parallel spectrum spread signals delayed at the delay step, and a transmitting step converts the multiplexed spectrum spread signal generated at the multiplexing step into a radio frequency signal and amplifies and transmits the radio frequency signal. Consequently, the maximum amplitude of the multiplexed spectrum spread signal can be reduced.

According to the spread spectrum communication method of the present invention, a receiving step receives a multiplexed spectrum spread signal which is obtained by adding and multiplexing a plurality of spectrum spread signals which are spread in a predetermined spread code list, each of the spectrum spread signals having a plurality of phase shifting amounts and a plurality of different delay amounts respectively, a quadrature detecting step generates, from the multiplexed spectrum spread signal, in-phase components and orthogonal components of the spectrum spread signals having a frequency band of a chip rate corresponding to the predetermined spread code list, a correlating step calculates an in-phase correlation value and an orthogonal correlation value which are correlation values between the in-phase components and the orthogonal components of the spectrum spread signals and the predetermined spread code list, a code synchronizing step generates a symbol clock which is common to the spectrum spread signals based on the in-phase correlation value and the orthogonal correlation value, a delay correcting step branches the in-phase correlation value and the orthogonal correlation value corresponding to a plurality of values of the spectral spread signals and performs delay correction to arrange peak values of the in-phase correlation value and the orthogonal correlation value corresponding to each delay amount of the spectrum spread signals, a phase-shift correcting step corrects shift of carrier phases of the in-phase correlation value and the orthogonal correlation value which are delay corrected at the delay correcting step corresponding to the phase shifting amounts, a demodulating step generates a plurality of demodulating signals corresponding to the spectrum spread signals from each of the in-phase correlation values and orthogonal correlation values which have the phases shifted at the phase-shift correcting step by using the clock symbol clock generated at the code synchronizing step, and a converting step converts a plurality of demodulation signals demodulated at the demodulating step into serial information. Consequently, each of the parallel spectrum spread signal can reliably be demodulated based on the multiplexed spectrum spread signal having a small maximum amplitude.

According to the spread spectrum communication method of the present invention, when carrying out parallel communication of a plurality of channels by using the same spread code list between a transmitting side device and a receiving side device, a first converting step converts input serial information into parallel information, a spread modulating step multiplies each of the parallel information list converted at the first converting step and the same spread code list respectively, thereby generating a plurality of parallel spectrum spread signals corresponding to the parallel information list, a phase shifting step shifts the parallel spectrum spread signals by a plurality of phase shifting amounts, the delay step delays the parallel spectrum spread signals having the phases shifted at the phase shifting step by different amounts, a multiplexing step generates a multiplexed spectrum spread signal obtained by adding the parallel spectrum spread signals delayed at the delay step, a transmitting step converts the multiplexed spectrum spread signal generated at the multiplexing step into a radio frequency signal and amplifies and transmits the radio frequency signal, and in the receiving side, a receiving step receives the multiplexed spectrum spread signal transmitted at the transmitting step, a quadrature detecting step generates, from the multiplexed spectrum spread signal, in-phase components and orthogonal components of the spectrum spread signals having a frequency band of a chip rate corresponding to the same spread code list, a correlating step calculates an in-phase correlation value and an orthogonal correlation value which are correlation values between the in-phase components and the orthogonal components of the spectrum spread signals and the predetermined spread code list, a code synchronizing step generates a symbol clock which is common to the spectrum spread signals based on the in-phase correlation value and the orthogonal correlation value, a delay correcting step branches the in-phase correlation value and the orthogonal correlation value corresponding to a plurality of values of the spectral spread signals and carries out delay and correction to arrange peak values of the in-phase correlation value and the orthogonal correlation value corresponding to each delay amount of the spectrum spread signals, a phase-shift correcting step corrects shift of carrier phases of the in-phase correlation value and the orthogonal correlation value which are delay corrected at the delay correcting step corresponding to the phase shifting amounts, a demodulating step generates a plurality of demodulating signals corresponding to the spectrum spread signals from each of the in-phase correlation values and orthogonal correlation values which have the phases shifted at the phase-shift correcting step by using the symbol clock generated at the code synchronizing step, and a second converting step converts a plurality of demodulation signals demodulated at the demodulating step into serial information. Consequently, the maximum amplitude of the multiplexed spectrum spread signal can be reduced.

Further, a part of the phase shifting amounts to be phase-shifted at the phase shifting step is set to an arbitrary phase of $\beta$ or a phase of $(\beta+\pi)$ and the other phase shifting amounts are set to a phase of $(\beta+\pi/2)$ or a phase of $(\beta-\pi/2)$. Consequently, the maximum amplitude of the multiplexed spectrum spread signal can be reduced by the minimum change in the phase.

Further, the phase shifting amounts to be phase-shifted at the phase shifting step is n (n is a natural number which is equal to or greater than 2), each phase shifting amount being an arbitrary phase of $(\gamma+p\pi/n)$ or a phase of $(\gamma+p\pi/n+\pi)$ (p=0 to n−1). Consequently, the phase shifting amount is given in such a manner that the maximum amplitude of the multiplexed spectrum spread signal can be minimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENTS

A spread spectrum communication system and a method for the same according to preferred embodiments of the present invention will be described below in detail with reference to the accompanying drawings.

Figure 1:
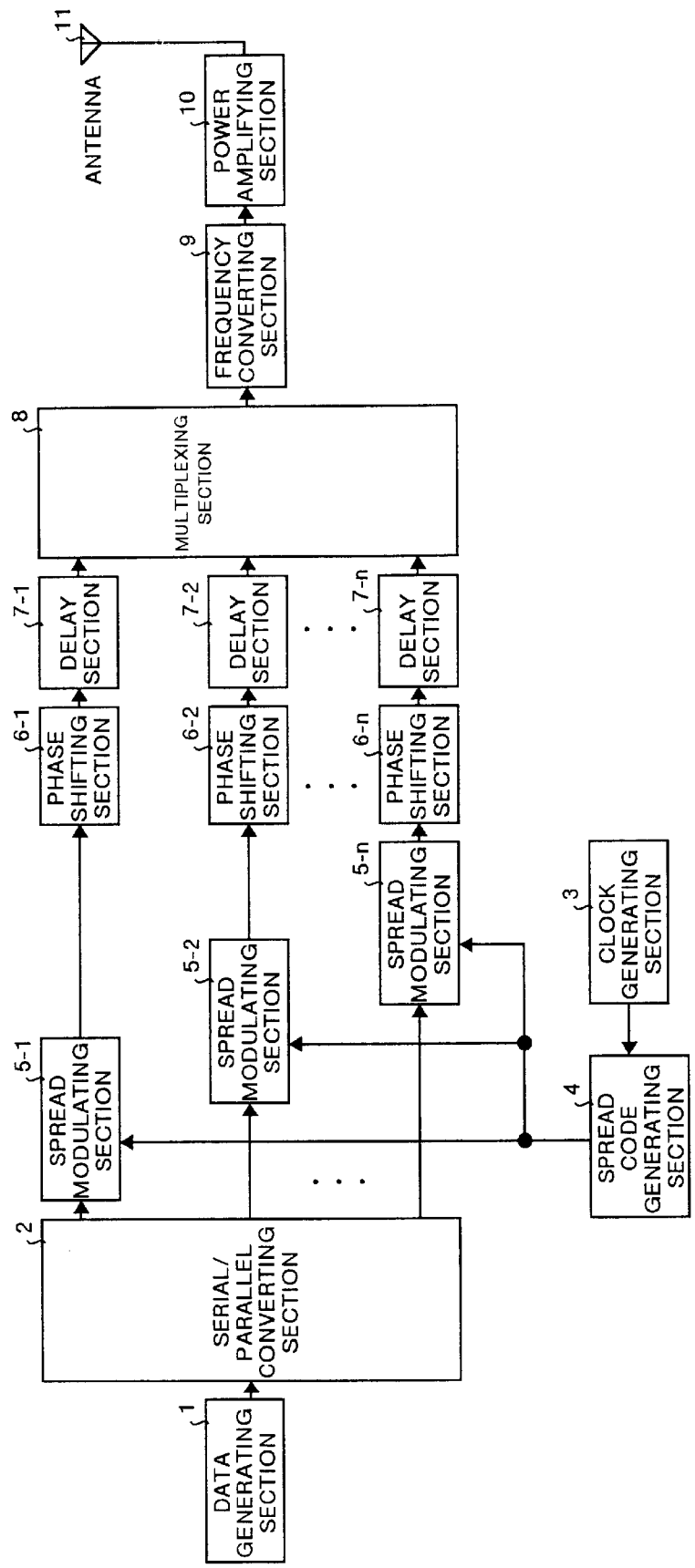
FIG. 1 is a block diagram showing the structure of a transmitting side device of a spread spectrum communication system according to a first embodiment of the present invention.

First of all, a first embodiment of the present invention will be described. FIG. 1 is a block diagram showing the structure of a transmitting side device of a spread spectrum communication system according to the first embodiment of the present invention. The transmitting side device shown in FIG. 1 has such a structure that phase shifting sections 6-1 to 6-n are connected between the spread modulating sections 125-1 to 125-n and delay sections 7-1 to 7-n shown in the structure of FIG. 17.

In FIG. 1, a data generating section 1 generates a binary digital information signal having a value of "1" or "−1". The bit rate, which is the speed of generation of the digital information signal, is denoted by "$R_b$". A serial/parallel converting section 2 converts the digital information signal input from the data generating section 1 into parallel information signal having n channels. The multiplex number n is equal to or less than a spread code length L (bit). A parallel bit rate which is the speed of generation of the parallel information signal in each channel is denoted by "$R_p$" ($=R_b/n$).

A spread code generating section 4 generates a spread code list. The spread code list has a value of "1" or "−1" and a spread code length L (bit), and is generated by a clock generating section 3 and has a clock frequency band which is the spread code length L times as much as the parallel bit rate $R_p$. It is desirable that the circuit which generates the codes has a simple structure and that the codes have a great auto-correlation characteristic and small cross-correlation therebetween. Therefore, as a suitable spread code list, for example, M list, Gold code and the like are used. A clock cycle having a chip rate $R_c$ ($=R_p \times L$) which is a clock rate generated by the clock generating section 3 is a chip cycle $T_c$ ($=1/R_c$).

Each one of the n channel parallel information signal converted by the serial/parallel converting section 2 is input into spread modulating sections 5-1 to 5-n, respectively. The spread modulating sections 5-1 to 5-n multiply the parallel information signal and a spread code input from the spread code generating section 4, and generates parallel spectrum spread signals for n channels. As a result, each of the parallel spectrum spread signal has a chip rate $R_c$.

Each of the phase shifting sections 6-1 to 6-n shifts a phase for the signal list of each of the parallel spectrum spread signal for the n channel which is spread and modulated by the spread modulating sections 5-1 to 5-n by a predetermined phase shifting amount $\{\alpha_1, \alpha_2, \alpha_3, \ldots \alpha_n\}$. The phase-shifted parallel spectrum spread signal is output to each of the delay sections 7-1 to 7-n. The phase shifting process of the phase shifting sections 7-1 to 7-n is carried out by the following equations (1) and (2) when a phase is shifted by $\alpha$ (radian) for the signal list of a parallel spectrum spread signal having an in-phase component $I_s$ and an orthogonal component $Q_s$.

$$I_d = SQRT(I_s^2 + Q_s^2) \times \cos(\alpha + \theta) \quad (1)$$

$$Q_d = SQRT(I_s^2 + Q_s^2) \times \sin(\alpha + \theta) \quad (2)$$

where SQRT (x) represents a square root of x. $I_d$ and $Q_d$ obtained using the equations (1) and (2) are the in-phase component and orthogonal component of the signal list of the parallel spectrum spread signal after the phase shifting. $\theta$ (radian) represents a value calculated by the following equation (3).

$$\theta = \tan-1(Q_s/I_s) \quad (3)$$

Thus, each of the parallel spectrum spread signal which is phase-shifted by the phase shifting amount $\{\alpha_1, \alpha_2, \alpha_3, \ldots \alpha_n\}$ by each of the phase shifting sections 6-1 to 6-n is input into each of the delay sections 7-1 to 7-n. Each of the delay sections 7-1 to 7-n delays the parallel spectrum spread signals by times $\{b_1, b_2, b_3, \ldots b_n\}$ respectively and output the same signals to the multiplexing section 8. The multiplexing section 8 performs multiplexing by adding each of the parallel spectrum spread signals which have been delayed differently, and a multiplexed spectrum spread signal thus obtained is sent to the frequency converting section 9. Although each of the parallel spectrum spread signal is spectrum-spread with the same spread code list in the spread modulating sections 5-1 to 5-n, they have been delayed differently the delay sections 7-1 to 7-n. Therefore, a cross-correlation between the data lists at the time of the code synchronization of the data list corresponding to the parallel spectrum spread signal is reduced on the receiving side where the multiplexed parallel spectrum spread signal is received.

The frequency converting section 9 frequency-converts the input multiplexed spectrum spread signal to obtain the radio frequency (RF), and then generates a multiplexed RF signal. The multiplexed RF signal is power-amplified by a power amplifying section 10 and transmitted using an antenna 11.

By providing the phase shifting sections 6-1 to 6-n, the maximum amplitude of the multiplexed spectrum spread signal output from the multiplexing section 8 is decreased. An example in the case of a multiplex number n=4 will be explained with reference to FIG. 3 to FIG. 5 and this case will be compared with the conventional example. Since the multiple number of n is "4", the transmitting side device shown in FIG. 1 has four spread modulating sections 5-1 to 5-4, four phase shifting sections 6-1 to 6-4 and four delay sections 7-1 to 7-4. The phase shifting sections 6-1 to 6-4 phase-shift the parallel spectrum spread signals input with the phase shifting amounts of $\{\alpha_1, \alpha_2, \alpha_3, \alpha_4\}$ respectively. In this embodiment, the phase shifting amounts of $\{\alpha_1, \alpha_2, \alpha_3, \alpha_4\}$ are assumed to be $\{0, \pi/2, 0, \pi/2\}$ (radian).

Figure 3:
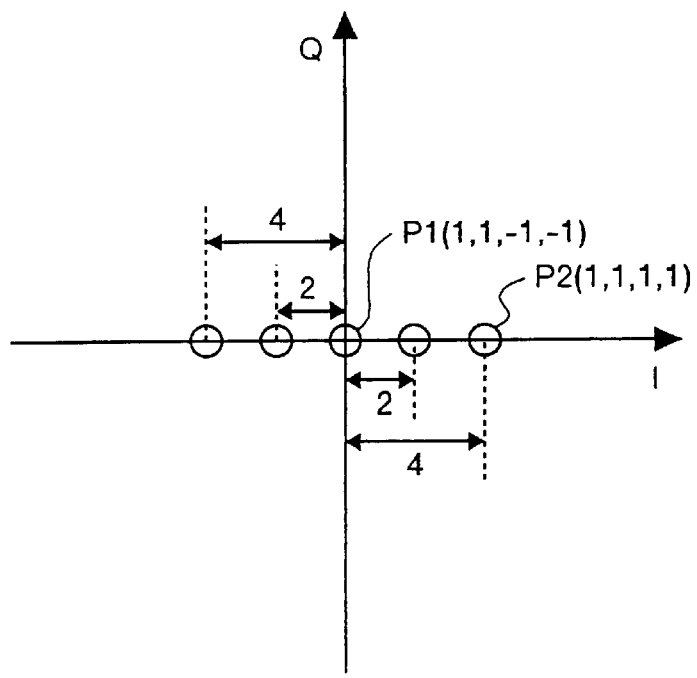
FIG. 3 is a constellation chart.showing a multiplexed spectrum spread signal by a conventional spread spectrum communication system.
Figure 17:
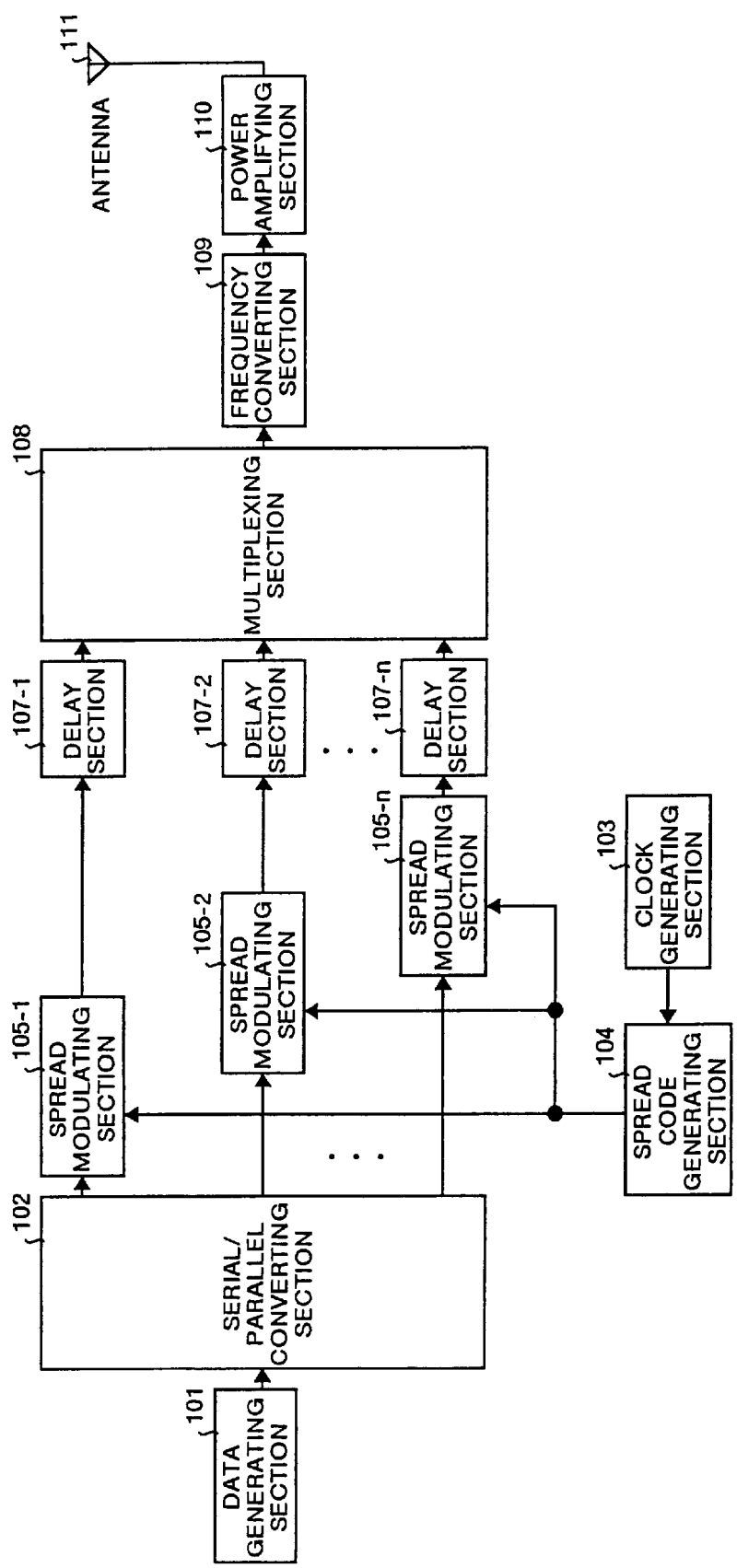
FIG. 17 is a block diagram showing the structure of a transmitting side device of a spread spectrum communication system according to the prior art.

FIG. 3 is a constellation chart showing a multiplexed spectrum spread signal output from the multiplexing section 108 in the case of the multiple number n=4 in the transmitting side device of the conventional spread spectrum communication system shown in FIG. 17. Parallel spectrum spread signal to be multiplexed in the conventional multiplexed spectrum spread signal are not phase-shifted. Therefore, as shown in FIG. 3, even if the parallel spectrum spread signals are added, the multiplexed spectrum spread signal is spread only on the I axis of in-phase. As a result, the maximum amplitude of the multiplexed spectrum spread signal is increased by four times.

For example, consider a case where the parallel signal list of each of the parallel spectrum spread signal is P1 $\{1, 1, -1, -1\}$. Since there is no phase shifting, the phase shifting amounts is equivalent to "0". Consequently, "1+1−1−1" is equal to zero along the I axis so that the amplitude of the multiplexed spectrum spread signal will be zero times. In the case where the parallel signal list is P2 $\{1, 1, 1, 1\}$, all of them are added so that "1+1+1+1" is equal to four and the amplitude of the multiplexed spectrum spread signal is increased by four times. The amplitude at this time will be the maximum amplitude value is obtained.

Figure 4:
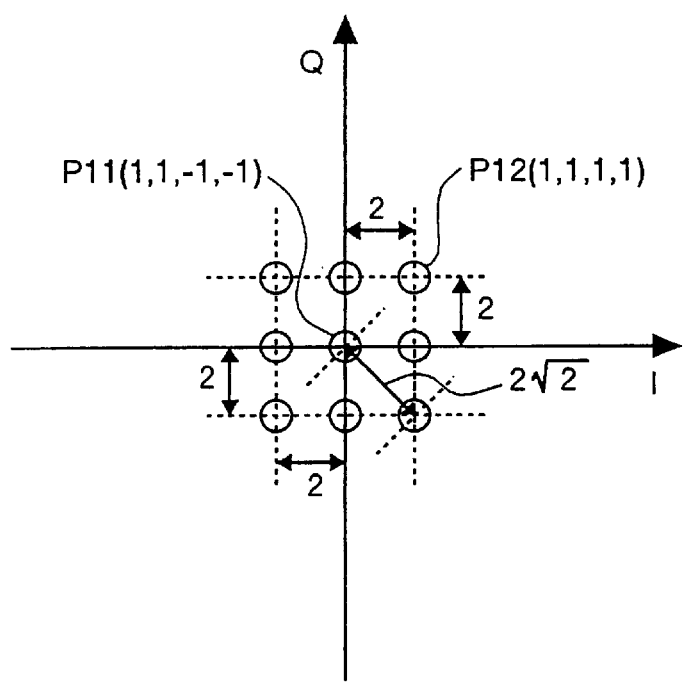
FIG. 4 is a constellation chart showing a multiple spectrum spread signal by the spread spectrum communication system according to the first embodiment of the present invention.
Figure 5:
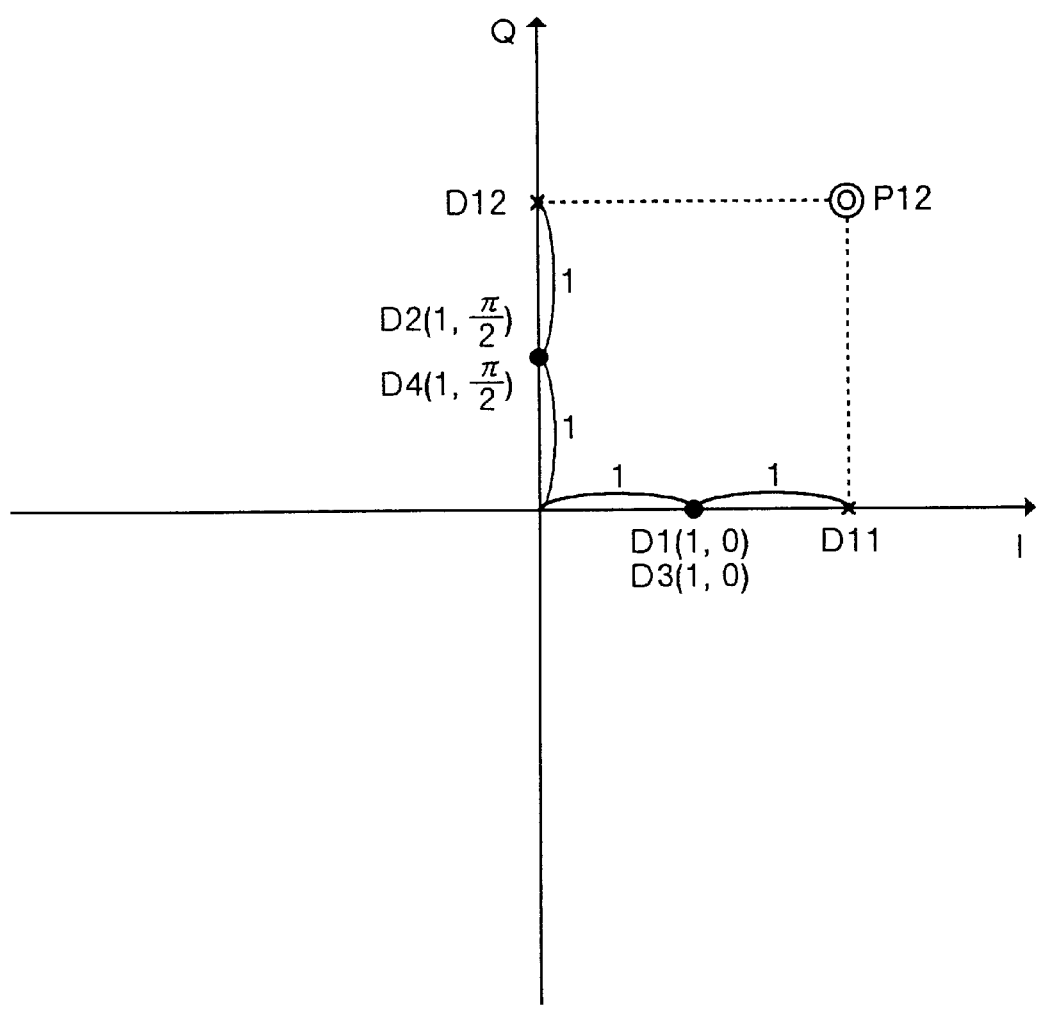
FIG. 5 is a chart illustrating one amplitude of the multiplexed spectrum spread signal shown in FIG. 4.

On the other hand, FIG. 4 is a constellation chart showing the multiplexed spectrum spread signal with a multiple number n=4 according to this embodiment. The maximum amplitude is increased by $2\times\sqrt{(2)}$ (≈2.83) times. In FIG. 4, for example, in the case where the parallel signal list of each of the parallel spectrum spread signal is P11 $\{1, 1, -1, -1\}$, a phase shifting amount of $\{0, \pi/2, 0, \pi/2\}$ corresponding to each of the parallel signal list is given. On a polar coordinate corresponding to an IQ coordinate, therefore, each signal is provided in positions of $\{(1, 0), (1, \pi/2), (1, \pi), (1, -\pi/2)\}$. A signal obtained by adding them is positioned at the origin of the polar coordinate and hence the amplitude will be zero. As shown in FIG. 5, moreover, in the case where the parallel signal list of the parallel spectrum spread signal is P12 $\{1, 1, 1, 1\}$, the phase of each of the parallel signal is shifted by $\{0, \pi/2, 0, \pi/2\}$ respectively. On the polar coordinate corresponding to the IQ coordinate, therefore, each signal is provided at the positions of $\{D1 (1, 0), D2 (1, \pi/2), D3 (1, 0), D4 (1, \pi/2)\}$ respectively. For example, the signals D1 and D3 are added on the I axis and are changed into a signal D11 having the amplitude two, and the signals D2 and D4 are added on the Q axis and are changed into a signal D12 having the amplitude two. If these signals D11 and D12 are added on a vector basis, they are positioned in P12 (2, 2) on the IQ coordinate and their amplitudes are set to $\sqrt{((2)^2+(2)^2)}=2\sqrt{(2)}$ times as described above. The amplitude at this time will be the maximum amplitude. The above-mentioned amplitude is a normalized value obtained when the amplitude of each of the parallel spectrum spread signal is one.

In this embodiment, accordingly, the phase shifting sections 6-1 to 6-n phase shift by $\{0, \pi/2, 0, \pi/2\}$ respectively. Therefore, the maximum amplitude of the multiple spectrum spread signal can be reduced from four in the prior art to $2\sqrt{(2)}$. Consequently, even if the power amplifying section 10 operates on an operating point having a small output back-off, the distortion amount of an output signal sent from the power amplifying section 10 can be reduced because the maximum amplitude is small.

Figure 6:
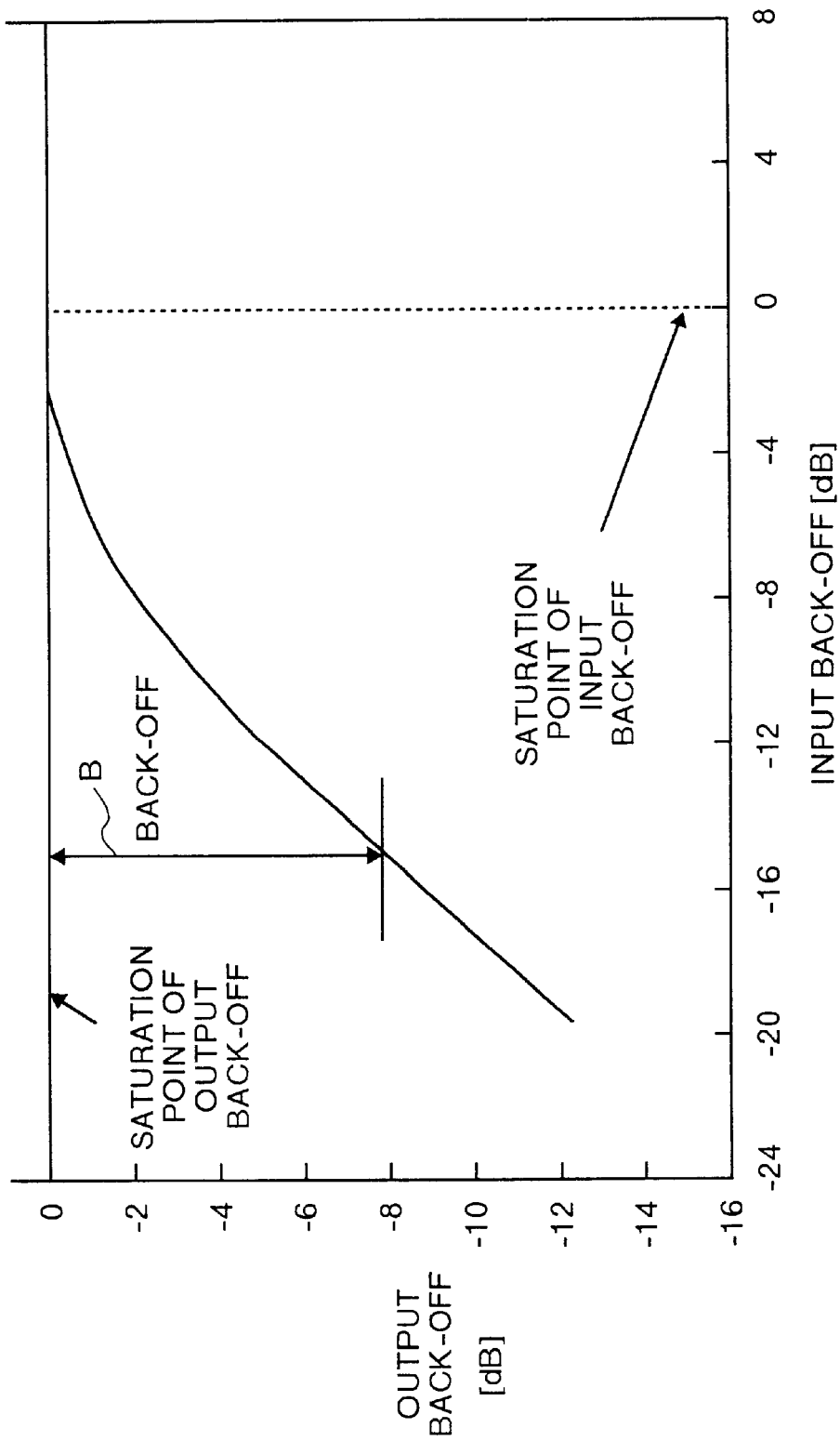
FIG. 6 is a chart showing a relationship between the output back-off and the input back-off in a power amplifying section and a back-off.
Figure 7:
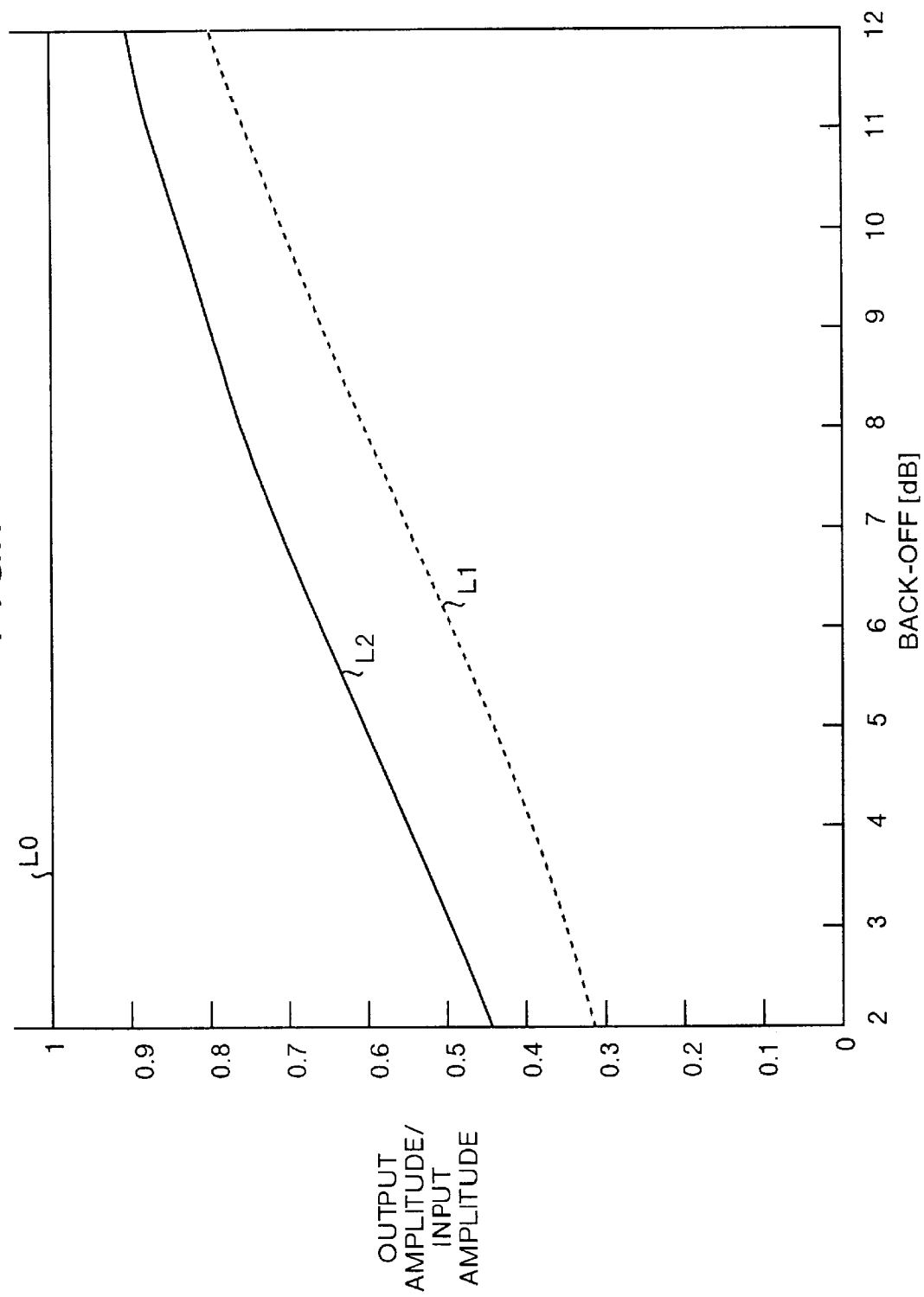
FIG. 7 is a chart showing an example of the characteristic of an output amplitude/input amplitude for the back-off according to the first embodiment of the present invention.

For example, consider a case where the power amplifying section 10 has the characteristic of an input back-off to an output back-off as shown in FIG. 6, and the phase shifting sections 6-1 to 6-4 phase shift by $\{0, \pi/2, 0, \pi/2\}$ respectively. The non-linear characteristic of the output amplitude/input amplitude for the back-off obtained in this case are explained below. FIG. 7 shows the non-linear characteristic of the output amplitude/input amplitude for a back-off [dB]. The back-off [dB] shown in FIG. 7 is obtained as a back-off B [dB] when the saturation point of the output back-off [dB] in the characteristic of the input back-off [dB] to output back-off [dB] shown in FIG. 6 is set to a reference point [0dB].

In FIG. 7, curve L0 represents the characteristic of the output amplitude/input amplitude obtained when the power amplifying section 10 operates linearly. The output amplitude/input amplitude is one irrespective of the value of the back-off B. Usually, the power amplifying section 10 shows a non-linear characteristic. When the above-mentioned multiplexed spectrum spread signal having a multiplex number n=4 is multiplied by the power amplifying section 10 having the non-linear characteristic shown in FIG. 6, the conventional transmitting side device which does not phase shift represents the output amplitude/input amplitude characteristic shown in a curve L1 for the back-off B. On the other hand, if the phase is shifted by $\{0, \pi/2, 0, \pi/2\}$ as in this embodiment, the maximum amplitude of the multiplexed spectrum spread signal is reduced. Consequently, the output amplitude/input amplitude characteristic shown by a curve L2 for the back-off B is obtained. The curve L2 represents an output amplitude/input amplitude characteristic which is always high as compared with the curve L1. Accordingly, amplification can be carried out with a high linearity by shifting the phase according to the first embodiment. As a result, an output distortion can be reduced.

Figure 2:
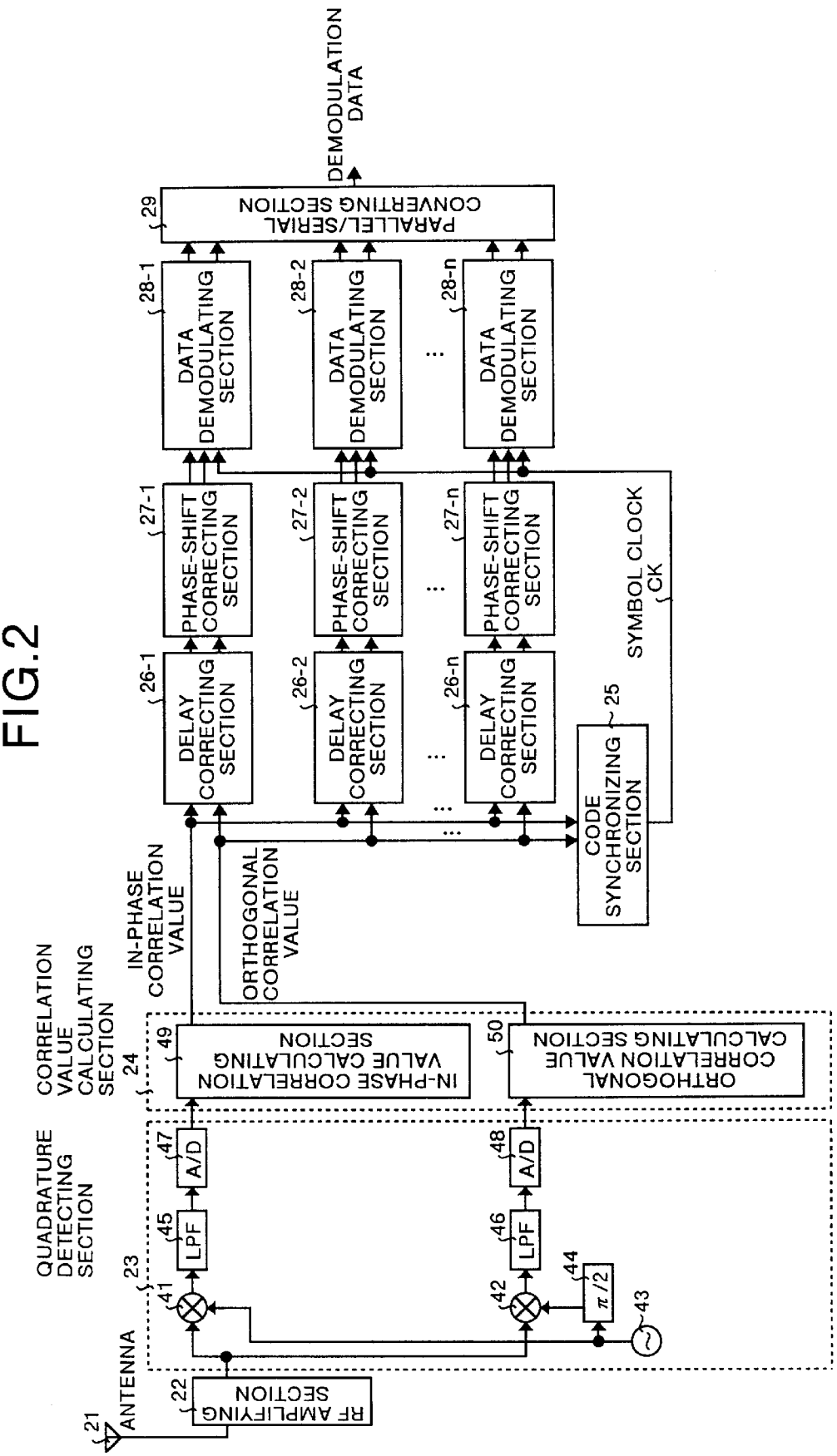
FIG. 2 is a block diagram showing the structure of a receiving side device of the spread spectrum communication system according to the first embodiment of the present invention.

On the other hand, FIG. 2 is a block diagram showing the structure of the receiving side device of the spread spectrum communication system according to the first embodiment of the present invention. In FIG. 2, an RF amplifying section 22 receives the multiplexed RF signal from an antenna 21 and amplifies the received signals. A quadrature detecting section 23 causes a multiplier 41 to multiply a local carrier signal output from a voltage-controlled oscillator (VCO) 43 and the multiplexed RF signal input from the RF amplifying section 22. The high frequency component of the multiplied signal is removed by a low-pass filter 45, and furthermore, the signal is converted into digital data by an A/D converter 47. Consequently, the in-phase component of a complex spectrum spread signal having the frequency band of the chip rate $R_c$ is generated. On the other hand, a multiplier 42 multiplies a local carrier signal which is phase-shifted by $\pi/2$ by means of a π/2 phase shifter 44 and the multiplexed RF signal input from the RF amplifying section 22 for a signal output from the voltage-controlled oscillator 43. The high frequency component of the multiplied signal is removed by a low-pass filter 46, and furthermore, the signal is converted into digital data by an A/D converter 48. Consequently, the orthogonal component of a complex spectrum spread signal having the frequency band of the chip rate $R_c$ is generated.

A correlation value calculating section 24 obtains a correlation between the complex spectrum spread signal input from the quadrature detecting section 23 and a spread code list which is the same as the spread code list generated by the spread code generating section 4. More specifically, an in-phase correlation value calculating section 49 in the correlation value calculating section 24 outputs, as an in-phase correlation value, a correlation value of the complex spectrum spread signal and the spread code list which is the same as a spread code multiplied to the multiplexed RF signal. Further, an orthogonal correlation value calculating section 50 in the correlation value calculating section 24 outputs, as an orthogonal correlation value, a correlation value of the complex spectrum spread signal and the spread code list which is the same as the spread code multiplied to the multiplexed RF signal. The correlation in the in-phase correlation value calculating section 49 and the orthogonal correlation value calculating section 50 can be implemented by using a matched filter and the like.

A code synchronizing section 25 generates a symbol clock CK synchronized with the cycle of the spread code list multiplied by the multiplexed RF signal from the in-phase correlation value and the orthogonal correlation value which are output from the correlation value calculating section 24, and output the symbol clock CK to data demodulating sections 28-1 to 28-n.

Delay correcting sections 26-1 to 26-n perform delay correction in such a manner that the timings of the peak values of the in-phase correlation value and the orthogonal correlation value for corresponding parallel spectrum spread signals match respectively. More specifically, the timing of the parallel spectrum spread signal which is caused due to provision of the delay by the delay sections 7-1 to 7-n shown in FIG. 1 is eliminated.

Phase-shift correcting sections 27-1 to 27-n correct the phase of each of the parallel spectrum spread signal which have been phase shifted by each of the phase shifting sections 6-1 to 6-n shown in FIG. 1 respectively. More specifically, the carrier phases of the n channel in-phase correlation value and the orthogonal correlation values match.

The data demodulating sections 28-1 to 28-n latch the in-phase correlation value and the orthogonal correlation value in a timing synchronous with the symbol clock CK for the in-phase correlation values and the orthogonal correlation values for the n channel which are output from the phase-shift correcting sections 27-1 to 27-n, respectively. Based on the latched in-phase correlation value and orthogonal correlation value, data decision is carried out to perform demodulation. Then, the demodulation data output from each of the data demodulating sections 28-1 to 28-n are converted into serial data by a parallel/serial converting section 29 and are output as n channel demodulation data. The parallel demodulation data output from the data demodulating sections 28-1 to 28-n have a parallel bit rate $R_p$ and are binary data signals having a value of "1" or "−1". Accordingly, the demodulation data having 1-channel bit rate $R_b$ ($=n \times R_p$) are output from the parallel/serial converting section 29.

Figure 8:
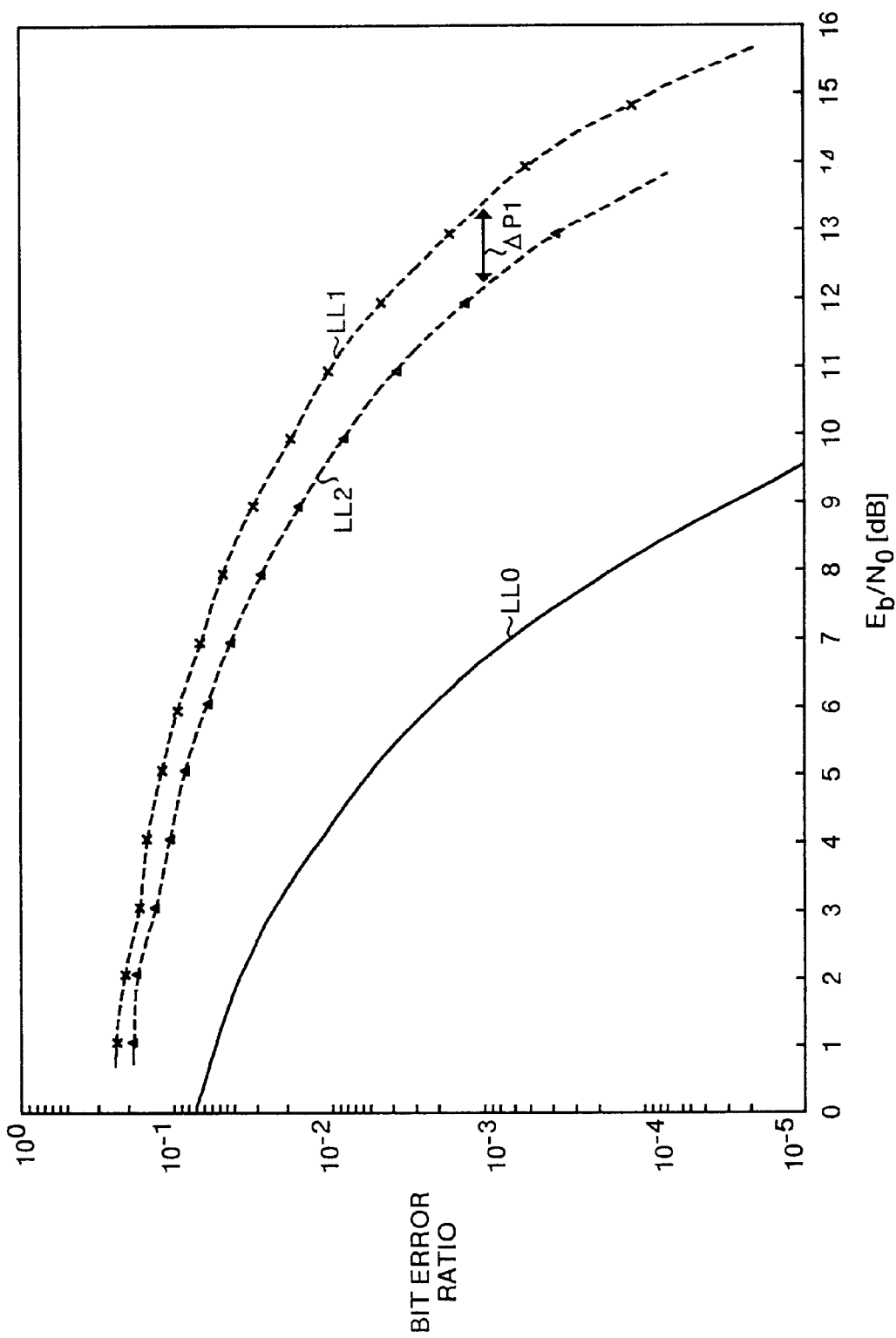
FIG. 8 is a chart showing a relationship between the bit error ratio and the average signal energy-to-noise power density ratio according to the first embodiment of the present invention.
Figure 18:
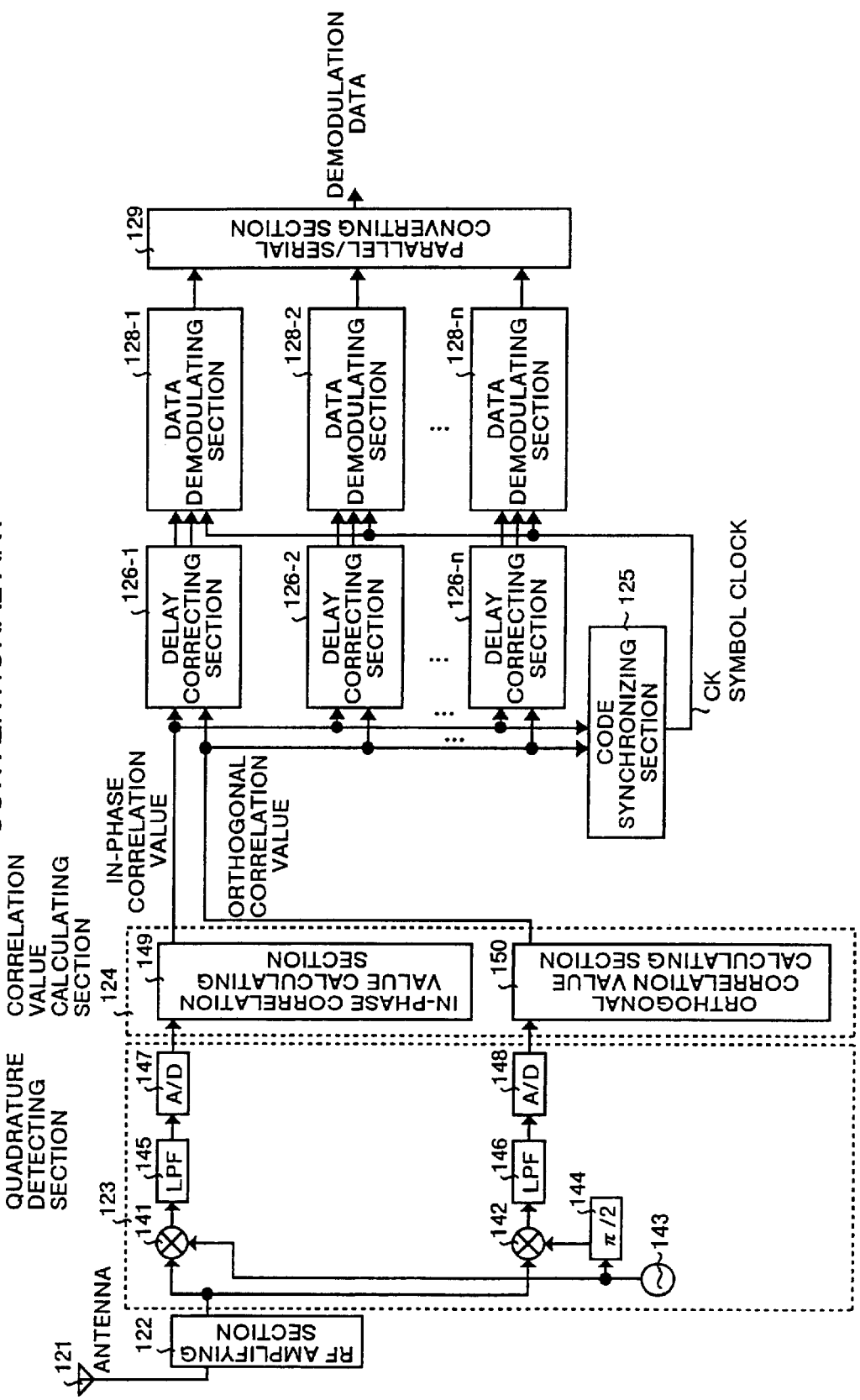
FIG. 18 is a block diagram showing the structure of a receiving side device of the spread spectrum communication system according to the prior art.

Bit error ratio obtained when data transmission and reception is carried out using the transmitting side device shown in FIG. 1 and the receiving side device shown in FIG. 2 is explained here. FIG. 8 is a graph showing a relationship between the bit error ratio and the average signal energy-to-noise power density ratio ($E_b/N_o$) [dB]. In FIG. 8, curve LL0 represents a change in an ideal bit error ratio which does not take an AM-AM characteristic and the like into consideration. Curve LL1 represents a change in a bit error ratio obtained by using the conventional spread spectrum communication system shown in FIG. 17 and FIG. 18 with a back-off of B=2 [dB]. Moreover, curve LL2 represents a change in a bit error ratio obtained by using the spread spectrum communication system according to this embodiment with a back-off of B=2 [dB]. All the bit error ratios shown in FIG. 8 are obtained when the multiplex number n is 4, and the bit error ratio shown in the curve LL2 is obtained when the phase shift of $\{\alpha_1, \alpha_2, \alpha_3, \alpha_4\}$ are $\{0, \pi/2, 0, \pi/2\}$ (radian) respectively.

A comparison between the curves LL1 and LL2 shown in FIG. 8 indicates, in this embodiment, the difference in the average signal energy-to-noise power density ratio required when the bit error ratio is $1 \times 10^{-3}$, for example, is $\Delta P1 \approx 1.2$ dB and is improved by about 1.2 dB as compared with the conventional spread spectrum communication system. As described above, the reason is that the maximum amplitude of the multiple spectrum spread signal can be reduced due to shifting of the phase using the phase shifting sections 6-1 to 6-n, thereby decreasing the distortion of the output amplitude by the non-linearity of the amplifier.

Figure 9:
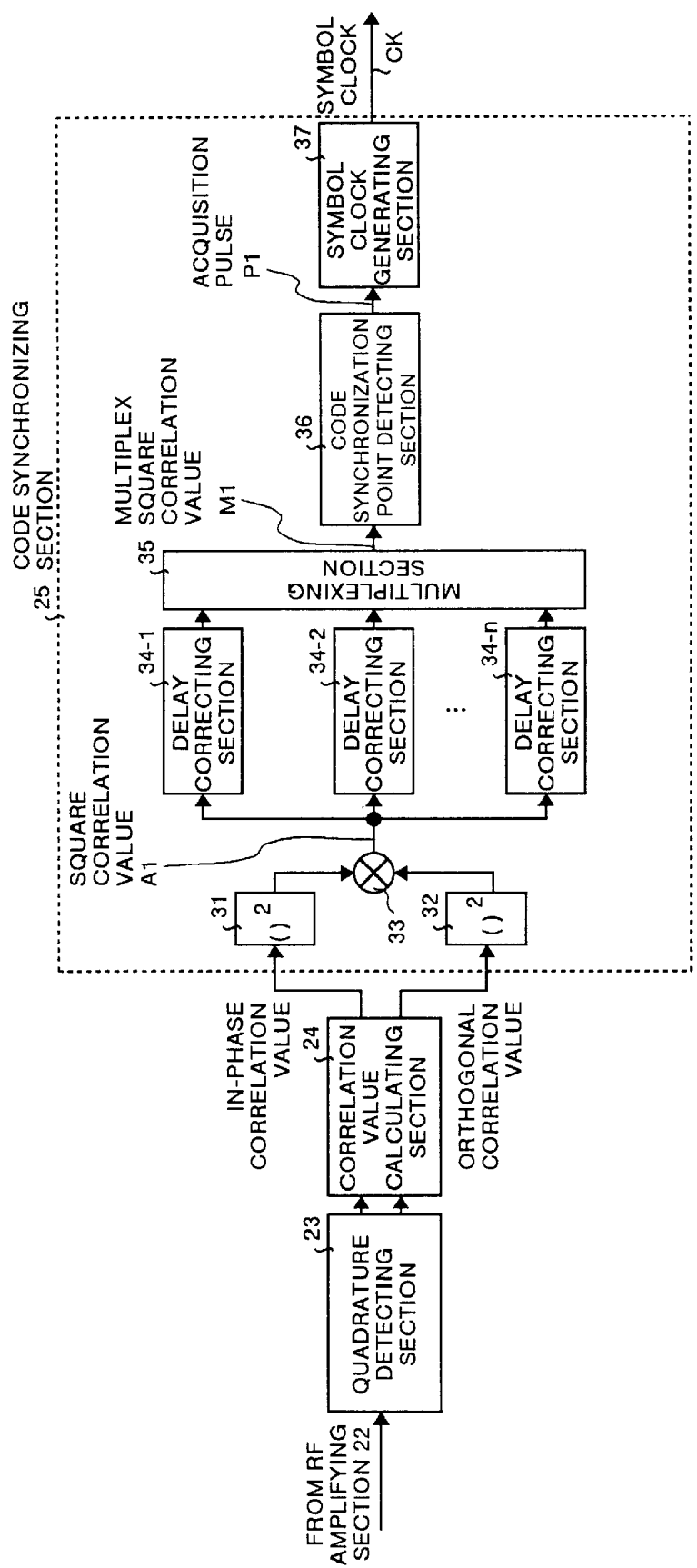
FIG. 9 is a block diagram showing the detailed structure of a code synchronizing section.

Next, the code synchronizing section 25 will be described in detail with reference to FIG. 9. The code synchronizing section 25 obtains code synchronization of the spread code list used in the spread modulating sections 5-1 to 5-n shown in FIG. 1 with the spread code list used in the above-mentioned correlation value calculating section 24 as shown in FIG. 2, and outputs the code synchronization as the symbol clock CK. In FIG. 9, a squarer 31 of the code synchronizing section 25 squares the in-phase correlation value output from the correlation value calculating section 24, and a squarer 32 squares the orthogonal correlation value output from the correlation value calculating section 24. A multiplier 33 multiplies the square values output from the squares 31 and 32, and outputs a square correlation value A1.

The square correlation value A1 is input into delay correcting sections 34-1 to 34-n corresponding to the n channel, respectively. Each of the delay correcting sections 34-1 to 34-n give such delay correcting times as to arrange the peak timings of correlation values (in-phase correlation values and orthogonal correlation values) corresponding to the parallel spectrum spread signals for the n channel. Then, a multiplexing section 35 adds all the (n in number) square correlation values which are delayed and corrected, and outputs a multiplex square correlation value M1 as a result of the addition to a code synchronization point detecting section 36.

The multiplex square correlation value M1 generates a great peak value at a time (a multiplex peak time) which is a predetermined time Y after the code synchronization point for one spread code cycle. The code synchronization point detecting section 36 detects this multiplex peak time and estimates the code synchronization point based on the detected multiplex peak time to generate a acquisition pulse P1 synchronous with the code synchronization point. A symbol clock generating section 37 generates a symbol clock CK synchronous with the timing of the acquisition pulse P1 and outputs the symbol clock CK to each of the data demodulating sections 28-1 to 28-n.

Figure 10:
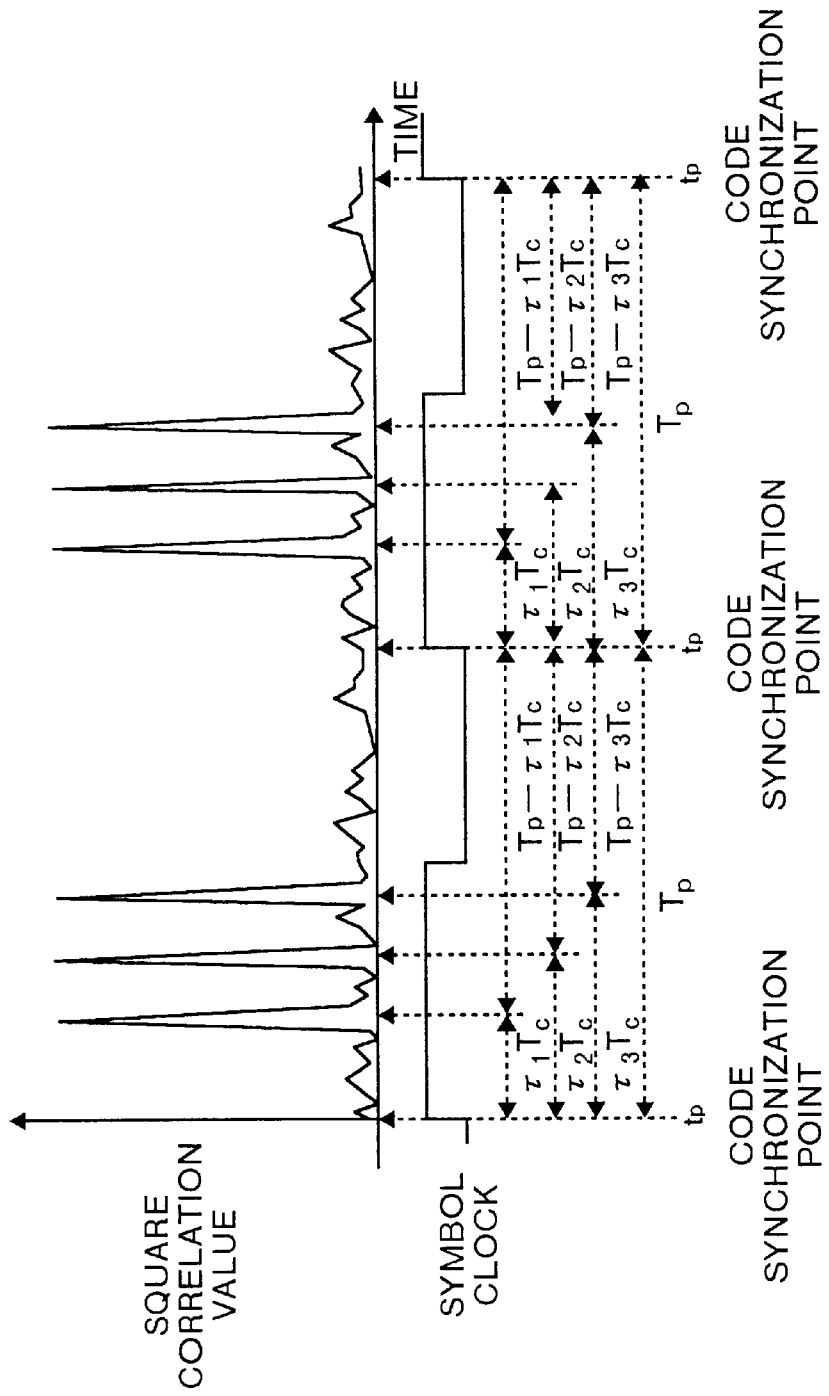
FIG. 10 is a timing chart showing a relationship between the square correlation value and the code synchronization point.

The process for estimating a code synchronization point is explained with reference to FIG. 10 to FIG. 12. It is assumed that the multiplex number n is 3 and the delay time $\{b_1, b_2, b_3\}$ of each of the parallel spectrum spread signal are $\{\tau_1 \cdot T_c, \tau_2 \cdot T_c, \tau_3 \cdot T_c\}$ respectively. $T_c$ represents a chip cycle as described above. In this case, the square correlation value shall have three peaks at the timing delayed from a code synchronization point $t_p$ by each delay time of $\{\tau_1 \cdot T_c, \tau_2 \cdot T_c, \tau_3 \cdot T_c\}$ as shown in FIG. 10.

Figure 11:
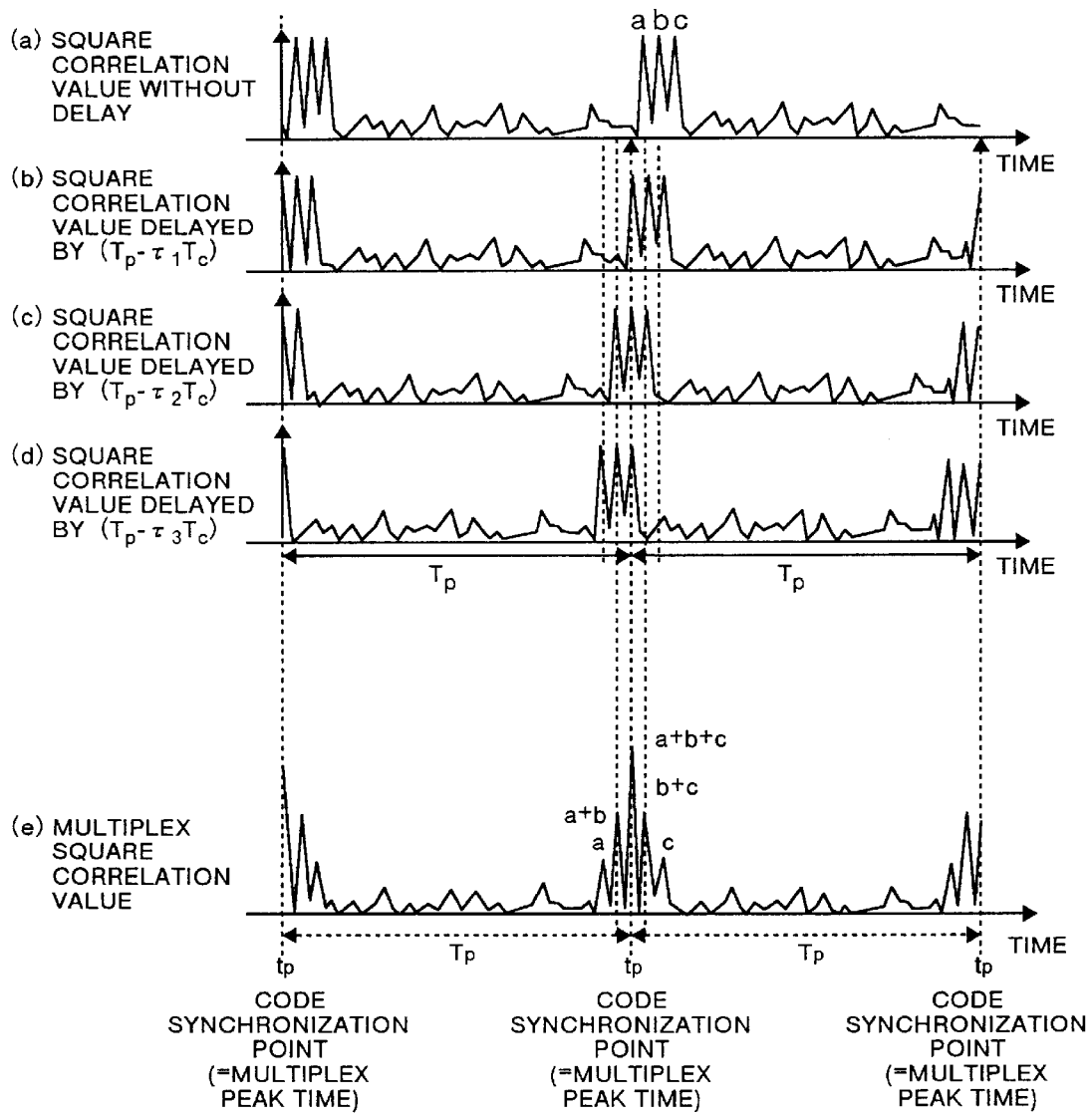
FIG. 11 is a timing chart showing an example of a relationship between the square correlation value and the multiple square correlation value.

FIG. 11 is a graph showing a relationship between the square correlation value and the multiplex square correlation value and a relationship with the multiplex peak time in the case of $\tau_1=2, \tau_2=4$ and $\tau_3=6$. (a) in FIG. 11 is a timing chart showing the square correlation value obtained without a delay, the square correlation value having three peak values of a to c. (b) to (d) in FIG. 11 show square correlation values obtained by delaying the square correlation value shown in (a) by $(T_p-\tau_1 \cdot T_c), (T_p-\tau_2 \cdot T_c)$ and $(T_p-\tau_3 \cdot T_c)$, respectively. $T_p$ represents a spread code cycle.

The multiplexing section 35 adds the square correlation values shown in (b) to (d). The result of the addition is the multiplex square correlation value shown in (e). The multiplex square correlation value has five peak values of a, a+b, a+b+c, b+c and c. The greatest peak value of (a+b+c) is detected as the multiplex peak time. The multiplex peak time is a predetermined time $Y=L \cdot T_c$ and is therefore coincident with the code synchronization point $t_p$. Accordingly, the code synchronization point detecting section 36 generates the acquisition pulse P1 synchronous with this multiplex peak time, and the symbol clock generating section 37 generates a symbol clock CK synchronous with the timing of the acquisition pulse P1. Consequently, synchronization with the transmitted spread code list can be taken.

Figure 12:
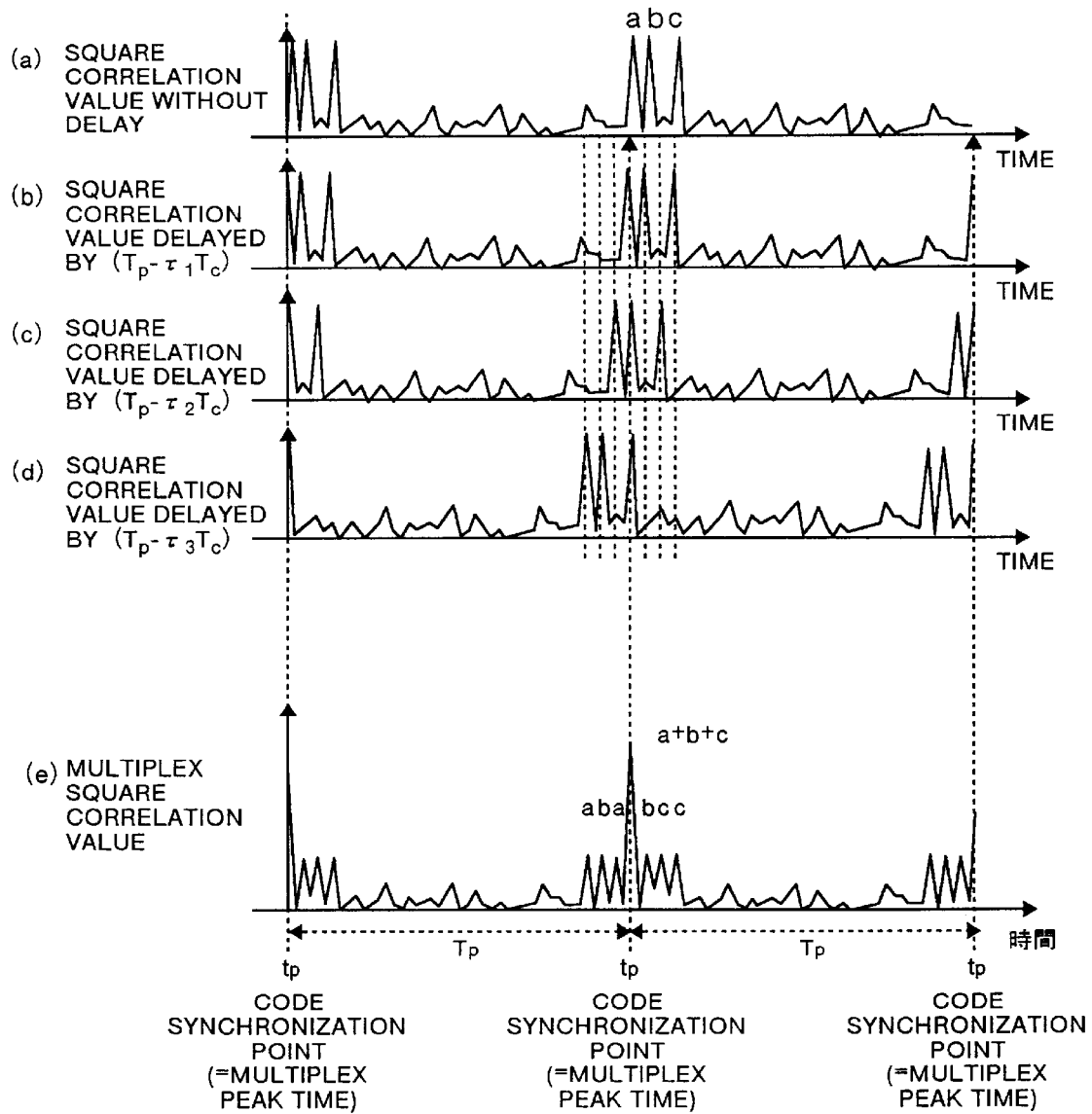
FIG. 12 is a timing chart showing an example of the relationship between the square correlation value and the multiple square correlation value.

FIG. 12 is a chart showing a relationship between the square correlation value and the multiplex square correlation value and a relationship with the multiplex peak time in the case of $\tau_1=1, \tau_2=3$ and $\tau_3=7$. (a) in FIG. 12 is a timing chart showing the square correlation value obtained without a delay, the square correlation value having three peak values of a to c. (b) to (d) in FIG. 12 show square correlation values obtained by delaying the square correlation value shown in (a) by $(T_p-\tau_1 \cdot T_c), (T_p-\tau_2 \cdot T_c)$ and $(T_p-\tau_3 \cdot T_c)$, respectively.

The multiplexing section 35 adds the square correlation values shown in (b) to (d). The result of the addition is the multiplex square correlation value shown in (e). The multiplex square correlation value has seven peak values of a, b, a, a+b+c, b, c and c. The greatest peak value of (a+b+c) is detected as a multiplex peak time. In this case, all the peak values but the peak value of (a+b+c) are limited to values for one peak value of the square correlation value, and the multiplex peak value can easily be detected. The multiplex peak time is a predetermined time $Y=L \cdot T_c$ and is therefore coincident with the code synchronization point $t_p$. Accordingly, the code synchronization point detecting section 36 generates the acquisition pulse P1 synchronous with this multiplex peak time, and the symbol clock generating section 37 generates the symbol clock CK synchronous with the timing of the acquisition pulse P1. Consequently, synchronization with the transmitted spread code list can be taken.

While the description has been mainly given on the assumption that the multiple number of n=4 and the phase shifting amounts of $\{\alpha_1, \alpha_2, \alpha_3, \alpha_4\}=\{0, \pi/2, 0, \pi/2\}$ (radian) are set in this embodiment, it is generally set that m phase shifting amounts (m=1, 2, . . . , n−1) are set to an arbitrary phase shifting amount β (radian) or (β+π) (radian) and residual (n−m) phase shifting amounts are set to (β+π/2) (radian) or (β−π/2) (radian) for the multiple number of n. In other words, since the multiplex spectrum spread signal having a phase shifted by using two kinds of phase shifting amounts is transmitted in this embodiment, n multiplex bidirectional transmission and receipt is obtained.

While the binary digital information signal having a value of "1" or "−1" has been used in this embodiment, other binary data may be used. Moreover, while the binary digital information signal input from the data generating section 1 has been converted into the parallel signal by the serial/parallel converting section 2 in this embodiment, the parallel information may be input into the spread modulating sections 5-1 to 5-n without the serial/parallel converting section 2 provided. Similarly, demodulation data may be directly output from each of the demodulating sections 28-1 to 28-n to a line corresponding to each channel without the parallel/serial converting section 29 provided. While the delay process has been carried out after the phase shifting process in this embodiment, the order of the processes may be changed to carry out the phase shifting process after the delay process. Moreover, although the latch process has been carried out after the phase shift correction has been performed for the synchronous correlation value and the orthogonal correlation value in this embodiment, the order may be changed to carry out the phase shift correction after the latch process.

According to the first embodiment, the phase of each of the parallel spectrum spread signal is shifted in order to control the maximum amplitude of the multiplexed spectrum spread signal obtained by adding the parallel spectrum spread signals. Therefore, even if an amplifier operating on an operating point having a small output back-off is used, the output distortion caused by the non-linearity of the amplifier can be reduced. As a result, a reduction in a bit error ratio can be suppressed.

The second embodiment of the present invention will be described below. While the phase of each of the parallel spectrum spread signal has been shifted by using the two kinds of phase shifting amounts and the parallel spectrum spread signal having the phase shifted has been multiplexed in the first embodiment, the phase of each of the parallel spectrum spread signal is shifted by n phase shifting amounts different from each other for n channel parallel spectrum spread signals and each of the parallel spectrum spread signal having the phase shifted is multiplexed in this second embodiment.

In the transmitting side device of a spread spectrum communication system according to this embodiment, the phase shifting sections 6-1 to 6-n shown in FIG. 1 shift the phases of the input parallel spectrum spread signals by phase shifting amounts different from each other. The other structure is the same as the structure shown in FIG. 1. Moreover, in the receiving side device of the spread spectrum communication system according to this embodiment, phase-shift correcting sections 27-1 to 27-n shown in FIG. 2 remove phase shifting offset by the phase shifting amounts in the phase shifting sections 6-1 to 6-n. The other structure is the same as the structure shown in FIG. 2.

Figure 13:
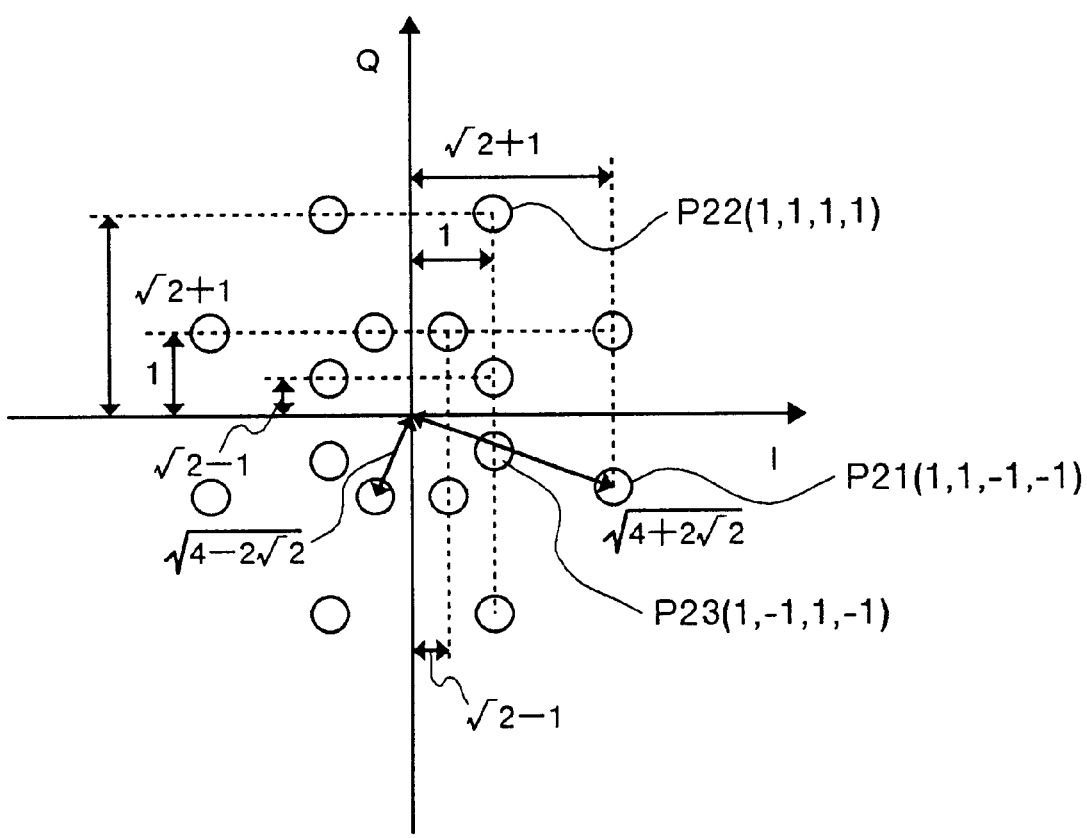
FIG. 13 is a constellation chart showing a multiplexed spectrum spread signal in a spread spectrum communication system according to a second embodiment of the present invention.
Figure 14:
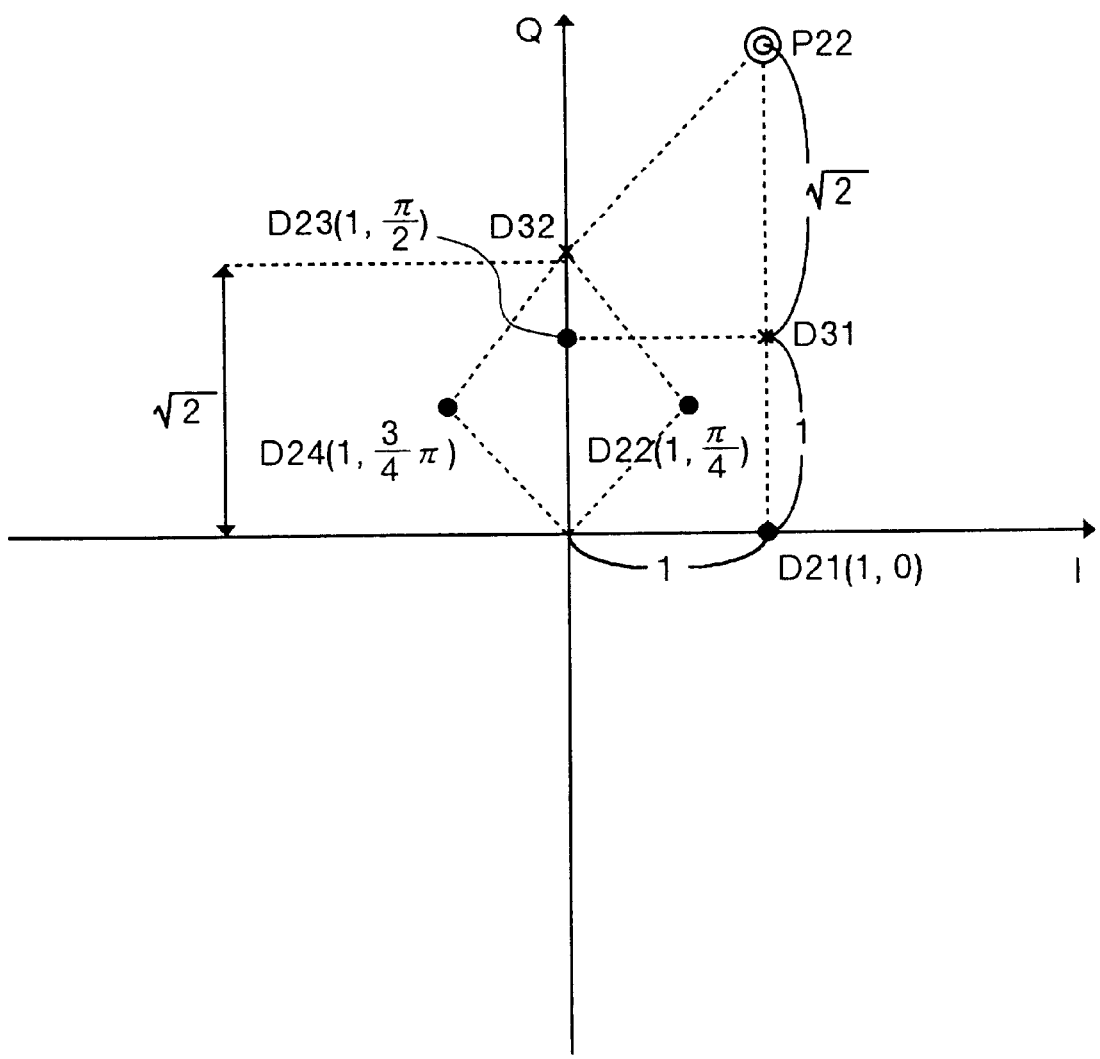
FIG. 14 is a chart illustrating one amplitude of the multiplexed spectrum spread signal shown in FIG. 13.

In this embodiment also it is assumed that the multiplex number n is 4 and the phase shifting amounts $\{\alpha_1, \alpha_2, \alpha_3, \alpha_4\}$ of the phase shifting sections 6-1 to 6-4 are $\{0, \pi/4, \pi/2, 3\pi/4\}$ (radian) respectively. FIG. 13 is a constellation chart showing the multiplexed spectrum spread signal according to this embodiment. The maximum amplitude is increased by $\sqrt{(4+2\times\sqrt{(2)})}$ ($\approx 2.61$) times. In FIG. 13, for example, in the case where the parallel signal list of each of the parallel spectrum spread signal is P21 [1, 1, −1, −1], a phase shifting amount of $\{0, \pi/4, \pi/2, 3\pi/4\}$ corresponding to each of the parallel signal list is given. On a polar coordinate corresponding to an IQ coordinate shown in FIG. 14, therefore, each signal is provided at positions of $\{D21 (1, 0), D22 (1, \pi/4), D23 (1, -\pi/2), D24 (1, -\pi/4)\}$. For example, the signals D21 and D23 are added on a vector basis and are changed into a signal D31 ($\sqrt{(2)}, \pi/4$) on the polar coordinate, and the signals D22 and D24 are added on a vector basis and are changed into a signal D32 ($\sqrt{(2)}, \pi/2$) on the polar coordinate. If these signals D31 and D32 are further added on a vector basis, they are changed into P22 $(1, \sqrt{(2)}+1)$ on the IQ coordinate and an amplitude thereof is increased by $\sqrt{(1^2+(\sqrt{(2)}+1)^2)}=\sqrt{(4+2\times\sqrt{(2)})}$ times as described above. The amplitude is a normalized value obtained when the amplitude of each of the parallel spectrum spread signal is set to "1".

In the second embodiment, accordingly, the phase shifting sections 6-1 to 6-4 shift the phase by amounts $\{0, \pi/4, \pi/2, 3\pi/4\}$ respectively. Therefore, the maximum amplitude of the multiple spectrum spread signal can be reduced from 4 to $\sqrt{(4+2\times\sqrt{(2)})}$, and can further be reduced as compared with the first embodiment. Consequently, even if the power amplifying section 10 operates on an operating point having a small output back-off, the distortion amount of an output signal sent from the power amplifying section 10 can be reduced still more because the maximum amplitude value is small.

Figure 15:
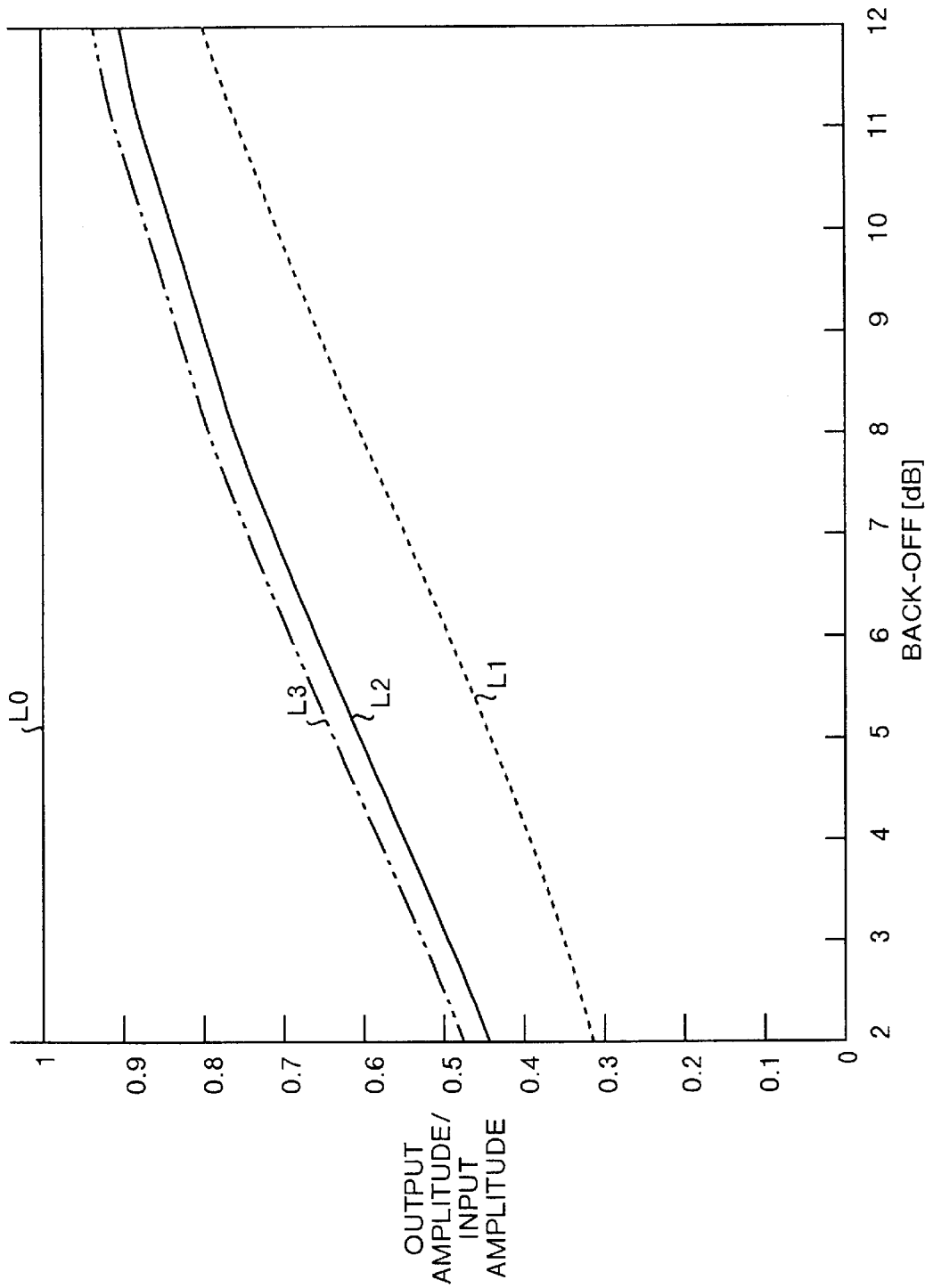
FIG. 15 is a chart showing the characteristic of an output amplitude/input amplitude for a back-off according to the second embodiment of the present invention.

In the case where the power amplifying section 10 has the characteristic of an input back-off to an output back-off as shown in FIG. 6, the phase shifting sections 6-1 to 6-4 shift the phase by the above-mentioned amounts $\{0, \pi/4, \pi/2, 3\pi/4\}$. The non-linear characteristic of the output amplitude/input amplitude for the back-off which is obtained at this time are explained here. FIG. 15 corresponds to FIG. 7 and shows the non-linear characteristic of the output amplitude/input amplitude for a back-off [dB]. The back-off [dB] shown in FIG. 7 is obtained as a back-off B [dB] when the saturation point of the output back-off [dB] in the characteristic of the input back-off [dB] to output back-off [dB] shown in FIG. 6 is set to a reference point [0 dB].

In FIG. 15, curve L0 represents the characteristic of the output amplitude/input amplitude obtained when the power amplifying section 10 operates linearly in the same manner as in FIG. 7. In this case, the output amplitude/input amplitude is "1" irrespective of the value of the back-off B in the same manner as in FIG. 7. Usually, the power amplifying section 10 shows a non-linear characteristic. Curve L1 indicates the output amplitude/input amplitude characteristic for the back-off B in the conventional transmitting side device giving no phase shifting amount which is obtained when the above-mentioned multiplexed spectrum spread signal having a multiplex number n=4 is amplified by the power amplifying section 10 having the non-linear characteristic shown in FIG. 6. Moreover, curve L2 indicates the output amplitude/input amplitude characteristic for the back-off of B which is obtained when the phase is shifted by the amounts $\{0, \pi/2, 0, \pi/2\}$ according to the first embodiment. Furthermore, curve L3 indicates output amplitude/input amplitude characteristic for the back-off B which is obtained when the phase is shifted by the amounts $\{0, \pi/4, \pi/2, 3\pi/4\}$ according to the second embodiment. In FIG. 15, the curve L3 according to second embodiment has a higher output amplitude/input amplitude characteristic than the curve L2 according to the first embodiment, and furthermore, amplification can be carried out with a high linearity. As a result, an output distortion can be reduced.

Figure 16:
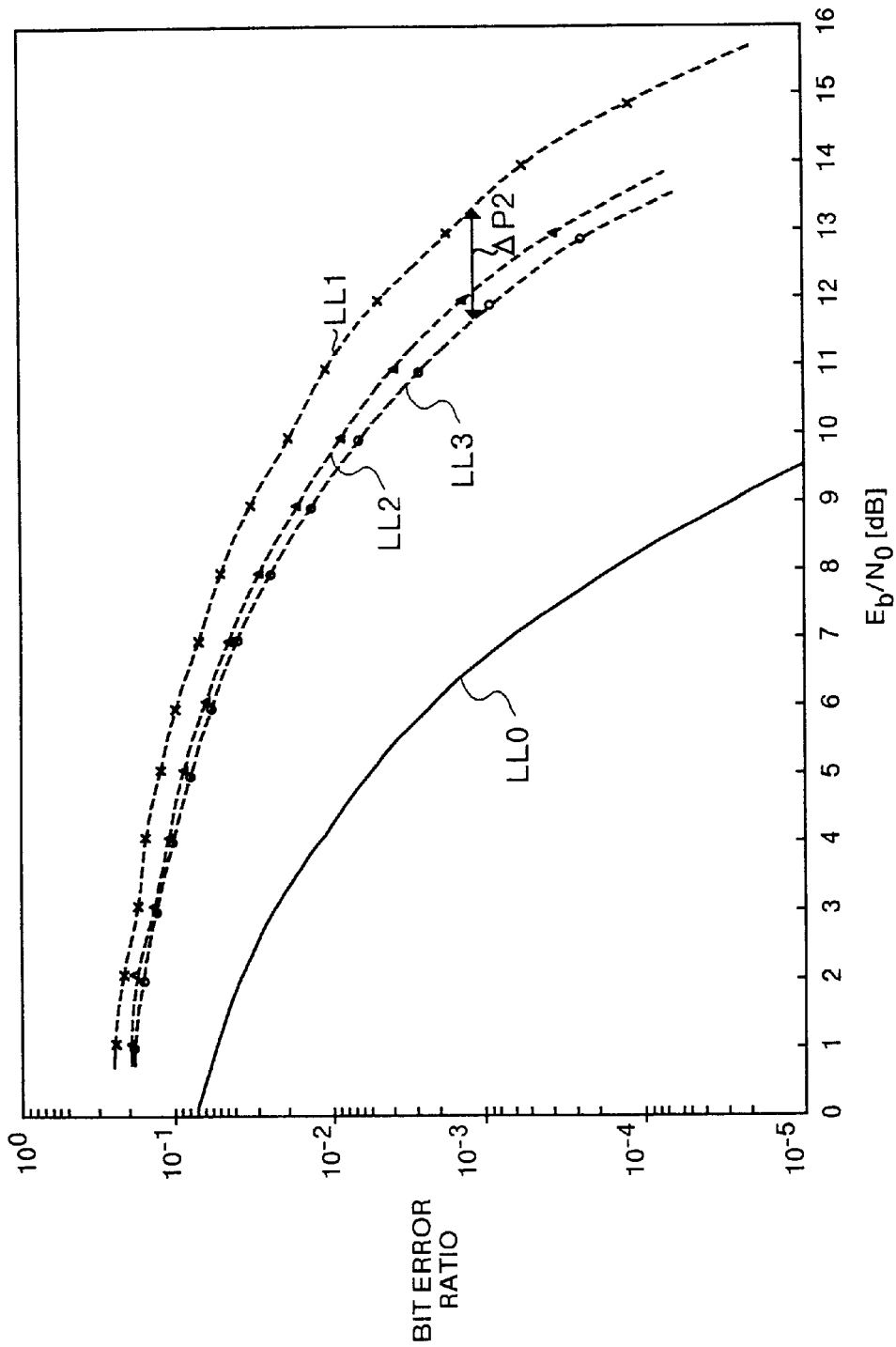
FIG. 16 is a chart showing a relationship between the bit error ratio and the average signal energy-to-noise power density ratio according to the second embodiment of the present invention.

Furthermore, FIG. 16 is a graph showing a relationship between the bit error ratio and the average signal energy-to-noise power density ratio ($E_b/N_o$) [dB] in the case where data transmission and receipt are carried out according to the second embodiment. In the same manner as in FIG. 8, in FIG. 16, curve LL0 represents a change in the ideal bit error ratio which does not take an AM-AM characteristic and the like into consideration, and curve LL1 represents a change in a bit error ratio obtained by using the conventional spread spectrum communication system shown in FIGS. 17 and 18 with a back-off of B=2 [dB]. Moreover, curve LL2 represents a change in the bit error ratio obtained by using the spread spectrum communication system according to the first embodiment with a back-off B=2 [dB]. Furthermore, curve LL3 represents a change in the bit error ratio obtained by using the spread spectrum communication system according to the second embodiment with a back-off of B=2 [dB]. All the bit error ratios shown in FIG. 16 are obtained with a multiple number of n=4, and the bit error ratio shown in the curve LL2 is obtained with phase shifting amounts of $\{\alpha_1, \alpha_2, \alpha_3, \alpha_4\}=\{0, \pi/2, 0, \pi/2\}$ (radian) and the bit error ratio shown in the curve LL3 is obtained with phase shifting amounts of $\{\alpha_1, \alpha_2, \alpha_3, \alpha_4\}=\{0, \pi/4, \pi/2, 3\pi/4\}$ (radian).

Comparison of the curves LL1 and LL3 shown in FIG. 16 indicates that, it is apparent that the curve LL3 according to the second embodiment has a difference in an average signal energy-to-noise power density ratio required with a bit error ratio of $1\times10^{-3}$, for example, $\Delta P2 \approx 1.5$ dB as compared with the curve LL1 and is improved by about 1.5 dB as compared with the conventional spread spectrum communication system and by about 0.3 dB as compared with the curve LL2 according to the first embodiment. As described above, the reason is that the maximum amplitude of the multiple spectrum spread signal can further be reduced due to shifting of the phase in the phase shifting sections 6-1 to 6-n, thereby decreasing the distortion of the output amplitude by the non-linearity of the amplifier still more.

A case is mainly explained on the assumption that the multiplex number n is 4 and the phase shifting amounts of $\{\alpha_1, \alpha_2, \alpha_3, \alpha_4\}=\{0, \pi/4, \pi/2, 3\pi/4\}$ (radian) in the above-mentioned second embodiment. However, n different phase shifting amounts of $\{\alpha_1, \alpha_2, \alpha_3, \ldots \alpha_n\}$ may be set to the multiple number of n. For example, if an arbitrary phase shifting amount of γ is set and p ∈ $\{0, 1, 2, 3, \ldots, n-1\}$ are set, each phase shifting amount can be set to γ+pπ/n (radian) or γ+pπ+π (radian). In other words, since the multiplexed spectrum spread signal which is phase-shifted by using n phase shifting amounts which are different from each other is transmitted in the second embodiment, n multiplex transmission and receipt in the n direction is obtained.

According to the second embodiment, the phase of each of the parallel spectrum spread signal is shifted by amounts which are different from each other in order to control the maximum amplitude of the multiplexed spectrum spread signal obtained by adding the parallel spectrum spread signals. Therefore, even if an amplifier operating on an operating point having a small back-off is used, the output distortion caused by the non-linearity of the amplifier can further be reduced. As a result, a reduction in a bit error ratio can be suppressed still more.

As explained above, in the spread spectrum communication system of the present invention, a converting unit converts input serial information into parallel information, a spread code generating unit generates a spread code list synchronous with a clock generated by the clock generating unit for generating a clock having a frequency band of a chip rate corresponding to a spread code length, a spread modulating unit multiplies each of the parallel information list converted by the converting unit and the spread code list generated by the spread code generating unit respectively, thereby generating a plurality of parallel spectrum spread signals corresponding to the parallel information list, a phase shifting unit shifts the parallel spectrum spread signals by a plurality of phase shifting amounts, a delay unit delays the parallel spectrum spread signals having the phases shifted by the phase shifting unit by different amounts, a multiplexing unit generates a multiplexed spectrum spread signal obtained by adding the parallel spectrum spread signals delayed by the delay unit, and a transmitting unit converts the multiplexed spectrum spread signal generated by the multiplexing unit into a radio frequency signal, amplifies and transmits the radio frequency signal. Consequently, the maximum amplitude of the multiplexed spectrum spread signal can be reduced. Therefore, even if an amplifier operating on an operating point having a small output back-off is used, the output distortion caused by the non-linearity of the amplifier can be reduced. As a result, a reduction in a bit error ratio can be suppressed.

In the spread spectrum communication system of the present invention, a receiving unit receives a multiplexed spectrum spread signal which is obtained by adding and multiplexing a plurality of spectrum spread signals which are spread in a predetermined spread code list, each of the spectrum spread signals having a plurality of phase shifting amounts and a plurality of different delay amounts respectively, a quadrature detecting unit generates, from the multiplexed spectrum spread signal, in-phase components and orthogonal components of the spectrum spread signals having a frequency band of a chip rate corresponding to the predetermined spread code list, a correlating unit calculates an in-phase correlation value and an orthogonal correlation value which are correlation values between the in-phase components and the orthogonal components of the spectrum spread signals and the predetermined spread code list, a code synchronizing unit generates a symbol clock which is common to the spectrum spread signals based on the in-phase correlation value and the orthogonal correlation value, a delay correcting unit branches the in-phase correlation value and the orthogonal correlation value corresponding to a plurality of values of the spectral spread signals and performs delay correction to arrange peak values of the in-phase correlation value and the orthogonal correlation value corresponding to each delay amount of the spectrum spread signals, a phase-shift correcting unit corrects shift of carrier phases of the in-phase correlation value and the orthogonal correlation value which are delay corrected by the delay correcting unit corresponding to the phase shifting amounts, a demodulating unit generates a plurality of demodulating signals corresponding to the spectrum spread signal from each of the in-phase correlation values and orthogonal correlation values which have the phases shifted by the phase-shift correcting unit, and a converting unit converts a plurality of demodulation signals demodulated by the demodulating unit into serial information. Consequently, each of the parallel spectrum spread signal can reliably be demodulated based on the multiplexed spectrum spread signal having a small maximum amplitude. Therefore, even if an amplifier operating on an operating point having a small output back-off is used, the output distortion caused by the non-linearity of the amplifier can be reduced. As a result, a reduction in a bit error ratio can be suppressed.

In the spread spectrum communication system of the present invention, when carrying out parallel communication of a plurality of channels by using the same spread code list between a transmitting side device and a receiving side device, in the transmitting side device, a first converting unit converts input serial information into parallel information, a spread code generating unit generates a spread code list synchronous with the clock generated by the clock generating unit for generating a clock having a frequency band of a chip rate corresponding to a spread code length, a spread modulating unit multiplies each of the parallel information list converted by the first converting unit and the spread code list generated by the spread code generating unit respectively, thereby generating a plurality of parallel spectrum spread signals corresponding to the parallel information list, a phase shifting unit shifts the parallel spectrum spread signals by a plurality of phase shifting amounts, the delay unit delays the parallel spectrum spread signals having the phases shifted by the phase shifting unit by different amounts, a multiplexing unit generates a multiplexed spectrum spread signal obtained by adding the parallel spectrum spread signals delayed by the delay unit, and a transmitting unit converts the multiplexed spectrum spread signal generated by the multiplexing unit into a radio frequency signal, amplifies and transmits the radio frequency signal, and in the receiving side device, a receiving unit receives a multiplexed spectrum spread signal transmitted from the transmitting unit, a quadrature detecting unit generates, from the multiplexed spectrum spread signal, in-phase components and orthogonal components of the spectrum spread signals having a frequency band of a chip rate corresponding to the same spread code list, a correlating unit calculates an in-phase correlation value and an orthogonal correlation value which are correlation values between the in-phase components and the orthogonal components of the spectrum spread signals and the predetermined spread code list, a code synchronizing unit generates a symbol clock which is common to the spectrum spread signals based on the in-phase correlation value and the orthogonal correlation value, a delay correcting unit branches the in-phase correlation value and the orthogonal correlation value corresponding to a plurality of values of the spectral spread signals and performs delay correction to arrange peak values of the in-phase correlation value and the orthogonal correlation value corresponding to each delay amount of the spectrum spread signals, a phase-shift correcting unit corrects shift of carrier phases of the in-phase correlation value and the orthogonal correlation value which are delay corrected by the delay correcting unit corresponding to the phase shifting amounts, a demodulating unit generates a plurality of demodulating signals corresponding to the spectrum spread signal from each of the in-phase correlation values and orthogonal correlation values which have the phases shifted by the phase-shift correcting unit, and a second converting unit converts a plurality of demodulation signals demodulated by the demodulating unit into serial information. Consequently, the maximum amplitude of the multiplexed spectrum spread signal can be reduced. Therefore, even if an amplifier operating on an operating point having a small output back-off is used, the output distortion caused by the non-linearity of the amplifier can be reduced. As a result, a reduction in a bit error ratio can be suppressed.

A part of the phase shifting amounts to be phase-shifted by the phase shifting unit is set to an arbitrary phase of $\beta$ or a phase of $(\beta+\pi)$ and the other phase shifting amounts are set to a phase of $(\beta+\pi/2)$ or a phase of $(\beta-\pi/2)$. Consequently, the maximum amplitude of the multiplexed spectrum spread signal can be reduced by the minimum change in the phase. Therefore, a reduction in a bit error ratio caused by the non-linearity of the amplifier can be reduced with a simple configuration.

The phase shifting amounts to be phase-shifted by the phase shifting unit is n (n is a natural number which is equal to or greater than 2), each phase shifting amount being an arbitrary phase of $(\gamma+p\pi/n)$ or a phase of $(\gamma+p\pi/n+\pi)$ (p=0 to n−1). Consequently, the phase shifting amount is given in such a manner that the maximum amplitude of the multiplexed spectrum spread signal can be minimized. Therefore, a reduction in a bit error ratio caused by the non-linearity of the amplifier can be reduced with a simple configuration.

In the spread spectrum communication method of the present invention, a converting step converts input serial information into parallel information, the spread modulating step multiplies each of the parallel information list converted at the converting step and a predetermined spread code list, thereby generating a plurality of parallel spectrum spread signals corresponding to the parallel information list, a phase shifting step shifts the parallel spectrum spread signals by a plurality of phase shifting amounts, a delay step delays the parallel spectrum spread signals having the phases shifted by the phase shifting step by different amounts, a multiplexing step generates a multiplexed spectrum spread signal obtained by adding the parallel spectrum spread signals delayed at the delay step, and a transmitting step converts the multiplexed spectrum spread signal generated at the multiplexing step into a radio frequency signal and amplifies and transmits the radio frequency signal. Consequently, the maximum amplitude of the multiplexed spectrum spread signal can be reduced. Therefore, even if an amplifier operating on an operating point having a small output back-off is used, the output distortion caused by the non-linearity of the amplifier can be reduced. As a result, a reduction in a bit error ratio can be suppressed.

In the spread spectrum communication method of the present invention, a receiving step receives a multiplexed spectrum spread signal which is obtained by adding and multiplexing a plurality of spectrum spread signals which are spread in a predetermined spread code list, each of the spectrum spread signals having a plurality of phase shifting amounts and a plurality of different delay amounts respectively, a quadrature detecting step generates, from the multiplexed spectrum spread signal, in-phase components and orthogonal components of the spectrum spread signals having a frequency band of a chip rate corresponding to the predetermined spread code list, a correlating step calculates an in-phase correlation value and an orthogonal correlation value which are correlation values between the in-phase components and the orthogonal components of the spectrum spread signals and the predetermined spread code list, a code synchronizing step generates a symbol clock which is common to the spectrum spread signals based on the in-phase correlation value and the orthogonal correlation value, a delay correcting step branches the in-phase correlation value and the orthogonal correlation value corresponding to a plurality of values of the spectral spread signals and performs delay correction to arrange peak values of the in-phase correlation value and the orthogonal correlation value corresponding to each delay amount of the spectrum spread signals, a phase-shift correcting step corrects shift of carrier phases of the in-phase correlation value and the orthogonal correlation value which are delay corrected at the delay correcting step corresponding to the phase shifting amounts, a demodulating step generates a plurality of demodulating signals corresponding to the spectrum spread signals from each of the in-phase correlation values and orthogonal correlation values which have the phases shifted at the phase-shift correcting step by using the clock symbol clock generated at the code synchronizing step, and a converting step converts a plurality of demodulation signals demodulated at the demodulating step into serial information. Consequently, each of the parallel spectrum spread signal can reliably be demodulated based on the multiplexed spectrum spread signal having a small maximum amplitude. Therefore, even if an amplifier operating on an operating point having a small output back-off is used, the output distortion caused by the non-linearity of the amplifier can be reduced. As a result, a reduction in a bit error ratio can be suppressed.

In the spread spectrum communication method of the present invention, when carrying out parallel communication of a plurality of channels by using the same spread code list between a transmitting side device and a receiving side device, a first converting step converts input serial information into parallel information, a spread modulating step multiplies each of the parallel information list converted at the first converting step and the same spread code list respectively, thereby generating a plurality of parallel spectrum spread signals corresponding to the parallel information list, a phase shifting step shifts the parallel spectrum spread signals by a plurality of phase shifting amounts, the delay step delays the parallel spectrum spread signals having the phases shifted at the phase shifting step by different amounts, a multiplexing step generates a multiplexed spectrum spread signal obtained by adding the parallel spectrum spread signals delayed at the delay step, a transmitting step converts the multiplexed spectrum spread signal generated at the multiplexing step into a radio frequency signal and amplifies and transmits the radio frequency signal, and in the receiving side, a receiving step receives the multiplexed spectrum spread signal transmitted at the transmitting step, a quadrature detecting step generates, from the multiplexed spectrum spread signal, in-phase components and orthogonal components of the spectrum spread signals having a frequency band of a chip rate corresponding to the same spread code list, a correlating step calculates an in-phase correlation value and an orthogonal correlation value which are correlation values between the in-phase components and the orthogonal components of the spectrum spread signals and the predetermined spread code list, a code synchronizing step generates a symbol clock which is common to the spectrum spread signals based on the in-phase correlation value and the orthogonal correlation value, a delay correcting step branches the in-phase correlation value and the orthogonal correlation value corresponding to a plurality of values of the spectral spread signals and carries out delay and correction to arrange peak values of the in-phase correlation value and the orthogonal correlation value corresponding to each delay amount of the spectrum spread signals, a phase-shift correcting step corrects shift of carrier phases of the in-phase correlation value and the orthogonal correlation value which are delay corrected at the delay correcting step corresponding to the phase shifting amounts, a demodulating step generates a plurality of demodulating signals corresponding to the spectrum spread signals from each of the in-phase correlation values and orthogonal correlation values which have the phases shifted at the phase-shift correcting step by using the symbol clock generated at the code synchronizing step, and a second converting step converts a plurality of demodulation signals demodulated at the demodulating step into serial information. Consequently, the maximum amplitude of the multiplexed spectrum spread signal can be reduced. Therefore, even if an amplifier operating on an operating point having a small output back-off is used, the output distortion caused by the non-linearity of the amplifier can be reduced. As a result, a reduction in a bit error ratio can be suppressed.

A part of the phase shifting amounts to be phase-shifted at the phase shifting step is set to an arbitrary phase of β or a phase of (β+π) and the other phase shifting amounts are set to a phase of (β+π/2) or a phase of (β−π/2). Consequently, the maximum amplitude of the multiplexed spectrum spread signal can be reduced by the minimum change in the phase. Therefore, a reduction in a bit error ratio caused by the non-linearity of the amplifier can be reduced with a simple configuration.

The phase shifting amounts to be phase-shifted at the phase shifting step is n (n is a natural number which is equal to or greater than 2), each phase shifting amount being an arbitrary phase of (γ+pπ/n) or a phase of (γ+pπ/n+π) (p=0 to n−1). Consequently, the phase shifting amount is given in such a manner that the maximum amplitude of the multiplexed spectrum spread signal can be minimized. Therefore, a reduction in a bit error ratio caused by the non-linearity of the amplifier can be reduced with a simple configuration.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A spread spectrum communication system comprising:
   a converting unit which converts input serial information into parallel information;
   a clock generating unit which generates a clock having a frequency band of a chip rate corresponding to a spread code length;
   a spread code generating unit which generates a spread code list synchronous with the clock generated by said clock generating unit;
   a spread modulating unit which multiplies each of the parallel information list converted by said converting unit and the spread code list generated by said spread code generating unit respectively, thereby generating a plurality of parallel spectrum spread signals corresponding to the parallel information list;
   a phase shifting unit which shifts the phase of the parallel spectrum spread signals by a plurality of phase shifting amounts;
   a delay unit which delays the parallel spectrum spread signals having the phases shifted by said phase shifting unit by different delay amounts;
   a multiplexing unit which generates a multiplexed spectrum spread signal by adding the parallel spectrum spread signals delayed by said delay unit; and
   a transmitting unit which converts the multiplexed spectrum spread signal generated by said multiplexing unit into a radio frequency signal, amplifies and then transmits the amplified radio frequency signal,
   wherein the phase shifting amounts reduce a bit error ratio of the amplified radio frequency signal, and
   wherein a part of the phase shifting amounts to be phase-shifted by said phase shifting unit is set to an arbitrary phase of β or a phase of (β+π) and the other phase shifting amounts are set to a phase of (β+π/2) or a phase of (β−π/2).

2. A spread spectrum communication system comprising:
   a converting unit which converts input serial information into parallel information;
   a clock generating unit which generates a clock having a frequency band of a chip rate corresponding to a spread code length;
   a spread code generating unit which generates a spread code list synchronous with the clock generated by said clock generating unit;
   a spread modulating unit which multiplies each of the parallel information list converted by said converting unit and the spread code list generated by said spread code generating unit respectively, thereby generating a plurality of parallel spectrum spread signals corresponding to the parallel information list;
   a phase shifting unit which shifts the phase of the parallel spectrum spread signals by a plurality of phase shifting amounts;
   a delay unit which delays the parallel spectrum spread signals having the phases shifted by said phase shifting unit by different delay amounts;
   a multiplexing unit which generates a multiplexed spectrum spread signal by adding the parallel spectrum spread signals delayed by said delay unit; and
   a transmitting unit which converts the multiplexed spectrum spread signal generated by said multiplexing unit into a radio frequency signal, amplifies and then transmits the amplified radio frequency signal,
   wherein the phase shifting amounts reduce a bit error ratio of the amplified radio frequency signal, and
   wherein the phase shifting amounts to be phase-shifted by said phase shifting unit is n (n is a natural number which is equal to or greater than 2), each phase shifting amount being an arbitrary phase of (γ+pπ/n) or a phase of (γ+pπ/n+π) (p=0 to n−1).

3. A spread spectrum communication system comprising:
   a receiving unit which receives a multiplexed spectrum spread signal obtained by adding and multiplexing a plurality of spectrum spread signals which are spread in a predetermined spread code list, the plurality of spectrum spread signals having phases shifted by a plurality of phase shifting amounts and delayed by a plurality of different delay amounts, wherein the phase shifting amounts reduce a bit error ratio of the received multiplexed spectrum spread signal;
   a quadrature detecting unit which generates, from the multiplexed spectrum spread signal, in-phase components and orthogonal components of the spectrum spread signals having a frequency band of a chip rate corresponding to the predetermined spread code list;
   a correlating unit which calculates an in-phase correlation value and an orthogonal correlation value which are correlation values between the in-phase components and the orthogonal components of the spectrum spread signals and the predetermined spread code list;
   a code synchronizing unit which generates a symbol clock which is common to the spectrum spread signals based on the in-phase correlation value and the orthogonal correlation value;
   a delay correcting unit which branches the in-phase correlation value and the orthogonal correlation value corresponding to a plurality of values of the spectral spread signals and performs delay correction to arrange peak values of the in-phase correlation value and the orthogonal correlation value corresponding to each delay amount of the spectrum spread signals;
   a phase-shift correcting unit which corrects shift of carrier phases of the in-phase correlation value and the orthogonal correlation value which are delay-corrected by said delay correcting unit, the corrected shift of carrier phases corresponding to the phase shifting amounts;

a demodulating unit which generates a plurality of demodulating signals corresponding to the spectrum spread signals from each of the in-phase correlation values and orthogonal correlation values which are phase-shift corrected by said phase-shift correcting unit by using the symbol clock generated by said code synchronizing unit; and a converting unit which converts a plurality of demodulation signals demodulated by said demodulating unit into serial information, wherein a part of the phase shifting amounts to be phase-shifted by said phase shifting unit is set to an arbitrary phase of $\beta$ or a phase of $(\beta+\pi)$ and the other phase shifting amounts are set to a phase of $(\beta+\pi/2)$ or a phase of $(\beta-\pi/2)$.

4. A spread spectrum communication system comprising:

a receiving unit which receives a multiplexed spectrum spread signal obtained by adding and multiplexing a plurality of spectrum spread signals which are spread in a predetermined spread code list, the plurality of spectrum spread signals having phases shifted by a plurality of phase shifting amounts and delayed by a plurality of different delay amounts, wherein the phase shifting amounts reduce a bit error ratio of the received multiplexed spectrum spread signal;

a quadrature detecting unit which generates, from the multiplexed spectrum spread signal, in-phase components and orthogonal components of the spectrum spread signals having a frequency band of a chip rate corresponding to the predetermined spread code list;

a correlating unit which calculates an in-phase correlation value and an orthogonal correlation value which are correlation values between the in-phase components and the orthogonal components of the spectrum spread signals and the predetermined spread code list;

a code synchronizing unit which generates a symbol clock which is common to the spectrum spread signals based on the in-phase correlation value and the orthogonal correlation value;

a delay correcting unit which branches the in-phase correlation value and the orthogonal correlation value corresponding to a plurality of values of the spectral spread signals and performs delay correction to arrange peak values of the in-phase correlation value and the orthogonal correlation value corresponding to each delay amount of the spectrum spread signals;

a phase-shift correcting unit which corrects shift of carrier phases of the in-phase correlation value and the orthogonal correlation value which are delay-corrected by said delay correcting unit, the corrected shift of carrier phases corresponding to the phase shifting amounts;

a demodulating unit which generates a plurality of demodulating signals corresponding to the spectrum spread signals from each of the in-phase correlation values and orthogonal correlation values which are phase-shift corrected by said phase-shift correcting unit by using the symbol clock generated by said code synchronizing unit; and a converting unit which converts a plurality of demodulation signals demodulated by said demodulating unit into serial information, wherein the phase shifting amounts to be phase-shifted by said phase shifting unit is n (n is a natural number which is equal to or greater than 2), each phase shifting amount being an arbitrary phase of $(\gamma+p\pi/n)$ or a phase of $(\gamma+p\pi/n+\pi)$ (p=0 to n−1).

5. A spread spectrum communication system comprising:

a transmitting side device and a receiving side device which perform between them parallel communication of a plurality of channels by using the same spread code list, said transmitting side device having, a first converting unit which converts input serial information into parallel information;

a clock generating unit which generates a clock having a frequency band of a chip rate corresponding to a spread code length;

a spread code generating unit which generates a spread code list synchronous with the clock generated by said clock generating unit;

a spread modulating unit which multiplies each of the parallel information list converted by said first converting unit and the spread code list generated by said spread code generating unit respectively, thereby generating a plurality of parallel spectrum spread signals corresponding to the parallel information list;

a phase shifting unit which shifts the phase of the parallel spectrum spread signals by a plurality of phase shifting amounts;

a delay unit which delays the parallel spectrum spread signals having the phases shifted by said phase shifting unit by different delay amounts;

a multiplexing unit which generates a multiplexed spectrum spread signal by adding the parallel spectrum spread signals delayed by said delay unit; and a transmitting unit which converts the multiplexed spectrum spread signal generated by said multiplexing unit into a radio frequency signal, amplifies and then transmits the amplified radio frequency signal, wherein the phase shifting amounts reduce a bit error ratio of the amplified radio frequency signal, and said receiving side device having, a receiving unit which receives the multiplexed spectrum spread signal transmitted from said transmitting unit;

a quadrature detecting unit which generates, from the multiplexed spectrum spread signal, in-phase components and orthogonal components of the spectrum spread signals having a frequency band of a chip rate corresponding to the same spread code list;

a correlating unit which calculates an in-phase correlation value and an orthogonal correlation value which are correlation values between the in-phase components and the orthogonal components of the spectrum spread signals and the predetermined spread code list;

a code synchronizing unit which generates a symbol clock which is common to the spectrum spread signals based on the in-phase correlation value and the orthogonal correlation value;

a delay correcting unit which branches the in-phase correlation value and the orthogonal correlation value corresponding to a plurality of values of the spectral spread signals and performs delay correction to arrange peak values of the in-phase correlation value and the orthogonal correlation value corresponding to each delay amount of the spectrum spread signals;

a phase-shift correcting unit which corrects shift of carrier phases of the in-phase correlation value and the orthogonal correlation value which are delay-corrected by said delay correcting unit corresponding to the phase shifting amounts;
a demodulating unit which generates a plurality of demodulating signals corresponding to the spectrum spread signals from each of the in-phase correlation values and orthogonal correlation values which are phase-corrected by said phase-shift correcting unit by using the symbol clock generated by said code synchronizing unit; and
a second converting unit which converts a plurality of demodulation signals demodulated by said demodulating unit into serial information,
wherein a part of the phase shifting amounts to be phase-shifted by said phase shifting unit is set to an arbitrary phase of $\beta$ or a phase of $(\beta+\pi)$ and the other phase shifting amounts are set to a phase of $(\beta+\pi/2)$ or a phase of $(\beta-\pi/2)$.

6. A spread spectrum communication system comprising:
a transmitting side device and a receiving side device which perform between them parallel communication of a plurality of channels by using the same spread code list,
said transmitting side device having,
  a first converting unit which converts input serial information into parallel information;
  a clock generating unit which generates a clock having a frequency band of a chip rate corresponding to a spread code length;
  a spread code generating unit which generates a spread code list synchronous with the clock generated by said clock generating unit;
  a spread modulating unit which multiplies each of the parallel information list converted by said first converting unit and the spread code list generated by said spread code generating unit respectively, thereby generating a plurality of parallel spectrum spread signals corresponding to the parallel information list;
  a phase shifting unit which shifts the phase of the parallel spectrum spread signals by a plurality of phase shifting amounts;
  a delay unit which delays the parallel spectrum spread signals having the phases shifted by said phase shifting unit by different delay amounts;
  a multiplexing unit which generates a multiplexed spectrum spread signal by adding the parallel spectrum spread signals delayed by said delay unit; and
  a transmitting unit which converts the multiplexed spectrum spread signal generated by said multiplexing unit into a radio frequency signal, amplifies and then transmits the amplified radio frequency signal, wherein the phase shifting amounts reduce a bit error ratio of the amplified radio frequency signal, and
said receiving side device having,
  a receiving unit which receives the multiplexed spectrum spread signal transmitted from said transmitting unit;
  a quadrature detecting unit which generates, from the multiplexed spectrum spread signal, in-phase components and orthogonal components of the spectrum spread signals having a frequency band of a chip rate corresponding to the same spread code list;
  a correlating unit which calculates an in-phase correlation value and an orthogonal correlation value which are correlation values between the in-phase components and the orthogonal components of the spectrum spread signals and the predetermined spread code list;
  a code synchronizing unit which generates a symbol clock which is common to the spectrum spread signals based on the in-phase correlation value and the orthogonal correlation value;
  a delay correcting unit which branches the in-phase correlation value and the orthogonal correlation value corresponding to a plurality of values of the spectral spread signals and performs delay correction to arrange peak values of the in-phase correlation value and the orthogonal correlation value corresponding to each delay amount of the spectrum spread signals;
  a phase-shift correcting unit which corrects shift of carrier phases of the in-phase correlation value and the orthogonal correlation value which are delay-corrected by said delay correcting unit corresponding to the phase shifting amounts;
  a demodulating unit which generates a plurality of demodulating signals corresponding to the spectrum spread signals from each of the in-phase correlation values and orthogonal correlation values which are phase-corrected by said phase-shift correcting unit by using the symbol clock generated by said code synchronizing unit; and
  a second converting unit which converts a plurality of demodulation signals demodulated by said demodulating unit into serial information,
  wherein the phase shifting amounts to be phase-shifted by said phase shifting unit is n (n is a natural number which is equal to or greater than 2), each phase shifting amount being an arbitrary phase of $(\gamma+p\pi/n)$ or a phase of $(\gamma+p\pi/n+\pi)$ (p=0 to n−1).

7. A spread spectrum communicating method comprising:
a converting step of converting input serial information into parallel information;
a spread modulating step of multiplying each of the parallel information list converted at the converting step and a predetermined spread code list, thereby generating a plurality of parallel spectrum spread signals corresponding to the parallel information list;
a phase shifting step of shifting the phase of the parallel spectrum spread signals by a plurality of phase shifting amounts;
a delay step of delaying the parallel spectrum spread signals having the phases shifted at the phase shifting step by different delay amounts;
a multiplexing step of generating a multiplexed spectrum spread signal obtained by adding the parallel spectrum spread signals delayed at the delay step; and
a transmitting step of converting the multiplexed spectrum spread signal generated at the multiplexing step into a radio frequency signal, amplifying and transmitting the amplified radio frequency signal, wherein the phase shifting amounts reduce a bit error ratio of the amplified radio frequency signal,
wherein a part of the phase shifting amounts to be phase-shifted at the phase shifting step is set to an arbitrary phase of $\beta$ or a phase of $(\beta+\pi)$ and the other phase shifting amounts are set to a phase of $(\beta+\pi/2)$ or a phase of $(\beta-\pi/2)$.

8. A spread spectrum communicating method comprising:
a converting step of converting input serial information into parallel information;
a spread modulating step of multiplying each of the parallel information list converted at the converting step and a predetermined spread code list, thereby generating a plurality of parallel spectrum spread signals corresponding to the parallel information list;

a phase shifting step of shifting the phase of the parallel spectrum spread signals by a plurality of phase shifting amounts;

a delay step of delaying the parallel spectrum spread signals having the phases shifted at the phase shifting step by different delay amounts;

a multiplexing step of generating a multiplexed spectrum spread signal obtained by adding the parallel spectrum spread signals delayed at the delay step; and a transmitting step of converting the multiplexed spectrum spread signal generated at the multiplexing step into a radio frequency signal, amplifying and transmitting the amplified radio frequency signal, wherein the phase shifting amounts reduce a bit error ratio of the amplified radio frequency signal, wherein the phase shifting amounts to be phase-shifted at the phase shifting step is n (n is a natural number which is equal to or greater than 2), each phase shifting amount being an arbitrary phase of $(\gamma+p\pi/n)$ or a phase of $(\gamma+p\pi/n+\pi)$ (p=0 to n−1).

9. A spread spectrum communicating method comprising:

a receiving step of receiving a multiplexed spectrum spread signal obtained by adding and multiplexing a plurality of spectrum spread signals which are spread in a predetermined spread code list, the plurality of spectrum spread signals having a plurality of phase shifting amounts and a plurality of different delay amounts respectively, wherein the phase shifting amounts reduce a bit error ratio of the received multiplexed spectrum spread signal;

a quadrature detecting step of generating, from the multiplexed spectrum spread signal, in-phase components and orthogonal components of the spectrum spread signals having a frequency band of a chip rate corresponding to the predetermined spread code list;

a correlating step of calculating an in-phase correlation value and an orthogonal correlation value which are correlation values between the in-phase components and the orthogonal components of the spectrum spread signals and the predetermined spread code list;

a code synchronizing step of generating a symbol clock which is common to the spectrum spread signals based on the in-phase correlation value and the orthogonal correlation value;

a delay correcting step of branching the in-phase correlation value and the orthogonal correlation value corresponding to a plurality of values of the spectral spread signals and performing delay correction to arrange peak values of the in-phase correlation value and the orthogonal correlation value corresponding to each delay amount of the spectrum spread signals;

a phase-shift correcting step of correcting shift of carrier phases of the in-phase correlation value and the orthogonal correlation value which are delay corrected at the delay correcting step, the corrected shift of carrier phases corresponding to the phase shifting amounts;

a demodulating step of generating a plurality of demodulating signals corresponding to the spectrum spread signals from each of the in-phase correlation values and orthogonal correlation values which are phase-shift corrected at the phase-shift correcting step by using the symbol clock generated at the code synchronizing step; and a converting step of converting a plurality of demodulation signals demodulated at the demodulating step into serial information, wherein a part of the phase shifting amounts to be phase-shifted at the phase shifting step is set to an arbitrary phase of $\beta$ or a phase of $(\beta+\pi)$ and the other phase shifting amounts are set to a phase of $(\beta+\pi/2)$ or a phase of $(\beta-\pi/2)$.

10. A spread spectrum communicating method comprising:

a receiving step of receiving a multiplexed spectrum spread signal obtained by adding and multiplexing a plurality of spectrum spread signals which are spread in a predetermined spread code list, the plurality of spectrum spread signals having a plurality of phase shifting amounts and a plurality of different delay amounts respectively, wherein the phase shifting amounts reduce a bit error ratio of the received multiplexed spectrum spread signal;

a quadrature detecting step of generating, from the multiplexed spectrum spread signal, in-phase components and orthogonal components of the spectrum spread signals having a frequency band of a chip rate corresponding to the predetermined spread code list;

a correlating step of calculating an in-phase correlation value and an orthogonal correlation value which are correlation values between the in-phase components and the orthogonal components of the spectrum spread signals and the predetermined spread code list;

a code synchronizing step of generating a symbol clock which is common to the spectrum spread signals based on the in-phase correlation value and the orthogonal correlation value;

a delay correcting step of branching the in-phase correlation value and the orthogonal correlation value corresponding to a plurality of values of the spectral spread signals and performing delay correction to arrange peak values of the in-phase correlation value and the orthogonal correlation value corresponding to each delay amount of the spectrum spread signals;

a phase-shift correcting step of correcting shift of carrier phases of the in-phase correlation value and the orthogonal correlation value which are delay corrected at the delay correcting step, the corrected shift of carrier phases corresponding to the phase shifting amounts;

a demodulating step of generating a plurality of demodulating signals corresponding to the spectrum spread signals from each of the in-phase correlation values and orthogonal correlation values which are phase-shift corrected at the phase-shift correcting step by using the symbol clock generated at the code synchronizing step; and a converting step of converting a plurality of demodulation signals demodulated at the demodulating step into serial information, wherein the phase shifting amounts to be phase-shifted at the phase shifting step is n (n is a natural number which is equal to or greater than 2), each phase shifting amount being an arbitrary phase of $(\gamma+p\pi/n)$ or a phase of $(\gamma+p\pi/n+\pi)$ (p=0 to n−1).

11. The spread spectrum communicating method for carrying out parallel communication of a plurality of channels by using the same spread code list between a transmitting side device and a receiving side device, comprising:

a first converting step of converting input serial information into parallel information;

a spread modulating step of multiplying each of the parallel information list converted at the first converting step and the same spread code list respectively, thereby generating a plurality of parallel spectrum spread signals corresponding to the parallel information list;

a phase shifting step of shifting the phase of the parallel spectrum spread signals by a plurality of phase shifting amounts;

a delay step of delaying the parallel spectrum spread signals having the phases shifted at the phase shifting step by different delay amounts;

a multiplexing step of generating a multiplexed spectrum spread signal obtained by adding the parallel spectrum spread signals delayed at the delay step;

a transmitting step of converting the multiplexed spectrum spread signal generated at the multiplexing step into a radio frequency signal, amplifying and transmitting the amplified radio frequency signal, wherein the phase shifting amounts reduce a bit error ratio of the amplified radio frequency signal;

a receiving step of receiving the multiplexed spectrum spread signal transmitted at the transmitting step;

a quadrature detecting step of generating, from the multiplexed spectrum spread signal, in-phase components and orthogonal components of the spectrum spread signals having a frequency band of a chip rate corresponding to the same spread code list;

a correlating step of calculating an in-phase correlation value and an orthogonal correlation value which are correlation values between the in-phase components and the orthogonal components of the spectrum spread signals and the predetermined spread code list;

a code synchronizing step of generating a symbol clock which is common to the spectrum spread signals based on the in-phase correlation value and the orthogonal correlation value;

a delay correcting step of branching the in-phase correlation value and the orthogonal correlation value corresponding to a plurality of values of the spectral spread signals and performing delay correction to arrange peak values of the in-phase correlation value and the orthogonal correlation value corresponding to each delay amount of the spectrum spread signals;

a phase-shift correcting step of correcting shift of carrier phases of the in-phase correlation value and the orthogonal correlation value which are delay corrected at the delay correcting step corresponding to the phase shifting amounts;

a demodulating step of generating a plurality of demodulating signals corresponding to the spectrum spread signals from each of the in-phase correlation values and orthogonal correlation values which are phase-shift corrected at the phase-shift correcting step by using the symbol clock generated at the code synchronizing step; and a second converting step of converting a plurality of demodulation signals demodulated at the demodulating step into serial information, wherein a part of the phase shifting amounts to be phase-shifted at the phase shifting step is set to an arbitrary phase of $\beta$ or a phase of $(\beta+\pi)$ and the other phase shifting amounts are set to a phase of $(\beta+\pi/2)$ or a phase of $(\beta-\pi/2)$.

12. A spread spectrum communicating method for carrying out parallel communication of a plurality of channels by using the same spread code list between a transmitting side device and a receiving side device, comprising:

a first converting step of converting input serial information into parallel information;

a spread modulating step of multiplying each of the parallel information list converted at the first converting step and the same spread code list respectively, thereby generating a plurality of parallel spectrum spread signals corresponding to the parallel information list;

a phase shifting step of shifting the phase of the parallel spectrum spread signals by a plurality of phase shifting amounts;

a delay step of delaying the parallel spectrum spread signals having the phases shifted at the phase shifting step by different delay amounts;

a multiplexing step of generating a multiplexed spectrum spread signal obtained by adding the parallel spectrum spread signals delayed at the delay step;

a transmitting step of converting the multiplexed spectrum spread signal generated at the multiplexing step into a radio frequency signal, amplifying and transmitting the amplified radio frequency signal, wherein the phase shifting amounts reduce a bit error ratio of the amplified radio frequency signal;

a receiving step of receiving the multiplexed spectrum spread signal transmitted at the transmitting step;

a quadrature detecting step of generating, from the multiplexed spectrum spread signal, in-phase components and orthogonal components of the spectrum spread signals having a frequency band of a chip rate corresponding to the same spread code list;

a correlating step of calculating an in-phase correlation value and an orthogonal correlation value which are correlation values between the in-phase components and the orthogonal components of the spectrum spread signals and the predetermined spread code list;

a code synchronizing step of generating a symbol clock which is common to the spectrum spread signals based on the in-phase correlation value and the orthogonal correlation value;

a delay correcting step of branching the in-phase correlation value and the orthogonal correlation value corresponding to a plurality of values of the spectral spread signals and performing delay correction to arrange peak values of the in-phase correlation value and the orthogonal correlation value corresponding to each delay amount of the spectrum spread signals;

a phase-shift correcting step of correcting shift of carrier phases of the in-phase correlation value and the orthogonal correlation value which are delay corrected at the delay correcting step corresponding to the phase shifting amounts;

a demodulating step of generating a plurality of demodulating signals corresponding to the spectrum spread signals from each of the in-phase correlation values and orthogonal correlation values which are phase-shift corrected at the phase-shift correcting step by using the symbol clock generated at the code synchronizing step; and a second converting step of converting a plurality of demodulation signals demodulated at the demodulating step into serial information, wherein the phase shifting amounts to be phase-shifted at the phase shifting step is n (n is a natural number which is equal to or greater than 2), each phase shifting amount being an arbitrary phase of $(\gamma+p\pi/n)$ or a phase of $(\gamma+p\pi/n+\pi)$ (p=0 to n−1).

13. A method of reducing distortion in an amplified spread spectrum signal being generated by a spread spectrum transmitter utilizing a direct spread method, the method comprising:

phase shifting parallel spectrum spread signals by a plurality of phase shifting amounts, multiplexing time-delayed and phase shifted parallel spectrum spread signals to produce a multiplexed spectrum spread signal, and amplifying the multiplexed spectrum spread signal, wherein the phase shifting amounts are chosen to reduce a bit error ratio of the amplified signal, and wherein a part of the phase shifting amounts to be phase-shifted at the phase shifting step is set to an arbitrary phase of $\beta$ or a phase of $(\beta+\pi)$ and the other phase shifting amounts are set to a phase of $(\beta+\pi/2)$ or a phase of $(\beta-\pi/2)$.

14. A method according of reducing distortion in an amplified spread spectrum signal being generated by a spread spectrum transmitter utilizing a direct spread method, the method comprising:

phase shifting parallel spectrum spread signals by a plurality of phase shifting amounts, multiplexing time-delayed and phase shifted parallel spectrum spread signals to produce a multiplexed spectrum spread signal, and amplifying the multiplexed spectrum spread signal, wherein the phase shifting amounts are chosen to reduce a bit error ratio of the amplified signal and wherein the phase shifting amounts to be phase-shifted at the phase shifting step is n (n is a natural number which is equal to or greater than 2), each phase shifting amount being an arbitrary phase of $(\gamma+p\pi/n)$ or a phase of $(\gamma+p\pi/n+\pi)$ (p=0 to n−1).

* * * * *